(12) United States Patent
Jiang

(10) Patent No.: US 10,979,167 B2
(45) Date of Patent: Apr. 13, 2021

(54) SYSTEMS AND METHOD OF MULTI-LASER WAVELENGTH CONTROL

(71) Applicant: Zhiping Jiang, Kanata (CA)

(72) Inventor: Zhiping Jiang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/148,565

(22) Filed: Oct. 1, 2018

(65) Prior Publication Data

US 2020/0106543 A1 Apr. 2, 2020

(51) Int. Cl.
| | |
|---|---|
| *H04J 14/02* | (2006.01) |
| *H04B 10/516* | (2013.01) |
| *H04L 5/00* | (2006.01) |
| *H04B 10/572* | (2013.01) |
| *H04B 10/50* | (2013.01) |

(52) U.S. Cl.
CPC ........ *H04J 14/0238* (2013.01); *H04B 10/503* (2013.01); *H04B 10/516* (2013.01); *H04B 10/572* (2013.01); *H04L 5/0048* (2013.01)

(58) Field of Classification Search
CPC ............................. H04J 14/0238; H04B 10/572
See application file for complete search history.

(56) References Cited

U.S. PATENT DOCUMENTS

| | | | | |
|---|---|---|---|---|
| 5,617,234 A | * | 4/1997 | Koga | .................. G02B 6/12011 385/37 |
| 5,724,166 A | * | 3/1998 | Nakata | ................. H04J 14/0227 370/242 |
| 7,120,359 B2 | * | 10/2006 | Way | ....................... G02F 1/0356 398/59 |
| 2004/0114149 A1 | | 6/2004 | Einstein et al. | |
| 2005/0063429 A1 | * | 3/2005 | Ahmadvand | ............. H01S 3/13 372/20 |
| 2006/0251424 A1 | * | 11/2006 | Nicholson | ............... G02F 1/365 398/141 |
| 2008/0031626 A1 | | 2/2008 | Welch et al. | |

(Continued)

FOREIGN PATENT DOCUMENTS

| | | |
|---|---|---|
| CN | 103022877 A | 4/2013 |
| CN | 107026391 A | 8/2017 |
| CN | 206596004 U | 10/2017 |

OTHER PUBLICATIONS

"Frequency Comb Generation Using a CMOS Compatible SiP DD-MZM for Flexible Networks", IEEE Photonics Technology Letters, vol. 30, No. 17, Sep. 1, 2018, pp. 1495-1498, Jiachuan Lin, Hassan Sepehrian et al.

(Continued)

*Primary Examiner* — David C Payne
*Assistant Examiner* — Pranesh K Barua

(57) ABSTRACT

Methods and apparatus are provided for wavelength control of multiple independent laser sources to reduce relative wavelength drift between the different laser sources. According to some aspects, multiple laser wavelength control is provided using a multi-line source as a wavelength reference. According to other aspects, multiple laser wavelength control is provided using a single wavelength sensing device. The multiple independent laser sources could generate the constituent optical channels of a super-channel. Benefits could include reduced guard band width and increased spectral efficiency within the super-channel.

23 Claims, 14 Drawing Sheets

(56) References Cited

U.S. PATENT DOCUMENTS

| | | | |
|---|---|---|---|
| 2012/0133931 A1* | 5/2012 | Fermann | H01S 3/0092 356/300 |
| 2015/0185141 A1* | 7/2015 | Fermann | H01S 3/0092 356/451 |
| 2016/0149742 A1* | 5/2016 | Yi | H04L 27/2659 398/76 |
| 2017/0010419 A1 | 1/2017 | Jiang | |
| 2017/0256909 A1* | 9/2017 | Braddell | G01J 3/42 |
| 2018/0048113 A1* | 2/2018 | Fermann | H01S 3/0085 |
| 2018/0246037 A1* | 8/2018 | Diebold | G02B 21/16 |
| 2018/0294874 A1 | 10/2018 | Jiang | |
| 2019/0235446 A1* | 8/2019 | Trupke | G04G 3/04 |
| 2019/0268085 A1* | 8/2019 | Urino | H01S 3/1118 |

OTHER PUBLICATIONS

"Frequency Comb Generation Using a CMOS Compatible SiP DD-MZM for Flexible Networks", IEEE Photonics Technology Letters, vol. 30, No. 17, Sep. 1, 2018, p. 1495., Jiachuan Lin, Hassan Sepehrian,et al.

"DSP-Enabled Frequency Locking for Near-Nyquist Spectral Efficiency Superchannels utilizing Integrated Photonics," Optical Communication Conference, San Diego, Mar. 2018, paper# W1B.3., Jeffrey Rahn et al.

"An InAs/InP quantum dot C-band coherent comb laser," Optical Communication Conference, San Diego, Mar. 2018,, paper# Th11. 4., Z.G. Lu1, J.R. Liu et al.

"Low-Cost Signal Spectrum Monitoring Enabled by Multiband Pilot Tone Techniques", Zhiping Jiang, Xuefeng Tang, Huawei Technologies Canada Co. Ltd.

"312-fs pulse generation from a passive C-band InAs/InP quantum dot mode-locked laser" Jul. 7, 2008 / vol. 16, No. 14 / Optics Express 10837, Z.G. Lu, et al.

"High performance InAs/InP quantum dot 34.462-GHz C-band coherent comb laser module" vol. 26, No. 2 | Jan. 22, 2018 | Optics Express 2166, Z. G. Lu, et al.

* cited by examiner

SYSTEMS AND METHOD OF MULTI-LASER WAVELENGTH CONTROL

FIELD

The present invention relates generally to a system and method for laser wavelength control, and, in particular embodiments, to a system and method for multi-laser wavelength control.

BACKGROUND

In some optical networks, for example wavelength division multiplex (WDM) systems, a plurality of channels are multiplexed. The term channel is used to refer to an optical carrier modulated by its data. A channel may also be referred to as an optical channel or a wavelength channel. A channel may be produced by a laser source, for example.

In WDM systems, different channels are separated in the wavelength/frequency domain. A guard band is often implemented between any two adjacent channels to mitigate an optical filtering effect and adjacent channel crosstalk. Adjacent channel crosstalk is caused by spectrum overlap between two adjacent channels. One source of adjacent channel crosstalk is optical carrier wavelength drift. Optical carrier wavelength drift may be caused by drift in the wavelength of a corresponding laser source.

For improved spectral efficiency, it is desirable to reduce the wavelength drift in laser sources, and therefore reduce the guard band implemented between two adjacent channels. Accordingly, a need exists for an improved method and system for multi-laser wavelength control.

SUMMARY

Generally, embodiments of the present disclosure provide a method and apparatus for multi-laser wavelength control with reduced relative wavelength drift between different lasers.

According to one aspect of the present invention there is provided a method involving splitting an output of a multi-line source into a plurality of wavelength reference signals, wherein the multi-line source comprises a plurality of wavelength lines having a fixed spacing there between, and each wavelength reference signal comprises the plurality of wavelength lines. The method also involves combining at least one wavelength reference signal of the plurality of wavelength reference signals with a respective optical channel of a plurality of optical channels. The method further involves determining, for the at least one wavelength reference signal, a wavelength offset between a center wavelength of the respective optical channel and a corresponding wavelength line of the plurality of wavelength lines. The method also involves tuning the center wavelength of the respective optical channel based on the wavelength offset of the respective optical channel.

In some embodiments, determining the wavelength offset between the center wavelength of the respective optical channel and the corresponding wavelength line of the plurality of wavelength lines comprises determining the wavelength offset between the center wavelength of the respective optical channel and a wavelength line of the plurality of wavelength lines that is closest to the center wavelength of the respective optical channel.

In some embodiments, tuning the center wavelength of the respective optical channel comprises tuning a laser source associated with the respective optical channel.

In some embodiments, the method further includes tuning the center wavelength of the respective optical channel to within a detection bandwidth for the corresponding wavelength line of the plurality of wavelength lines.

In some embodiments, determining the wavelength offset between the center wavelength of the respective optical channel and the corresponding wavelength line of the plurality of wavelength lines comprises determining a beating frequency between the respective optical channel and the corresponding wavelength line of the plurality of wavelength lines.

In some embodiments, tuning the center wavelength of the respective optical channel based on the wavelength offset of the respective optical channel comprises tuning the center wavelength of the respective optical channel to reduce the beating frequency between the respective optical channel and the corresponding wavelength line of the plurality of wavelength lines.

In some embodiments, tuning the center wavelength of the respective optical channel based on the wavelength offset comprises tuning the center wavelength of the respective optical channel to a predefined value for the beating frequency between the respective optical channel and the corresponding wavelength line of the plurality of wavelength lines.

In some embodiments, combining the at least one wavelength reference signal of the plurality of wavelength reference signals with the respective optical channel of the plurality of optical channels includes combining a first wavelength reference signal of the plurality of wavelength reference signals with a first optical channel of the plurality of optical channels and combining a second wavelength reference signal of the plurality of wavelength reference signals with a second optical channel of the plurality of optical channels. The determining, for the at least one wavelength reference signal, the wavelength offset between the center wavelength of the respective optical channel and the corresponding wavelength line of the plurality of wavelength lines includes determining, for the first wavelength reference signal, a first wavelength offset between a center wavelength of the first optical channel and a first wavelength line of the plurality of wavelength lines and determining, for the second wavelength reference signal, a second wavelength offset between a center wavelength of the second optical channel and a second wavelength line of the plurality of wavelength lines.

In some embodiments, splitting the output of the multi-line source comprises splitting an output of a comb laser or a comb generator.

According to one aspect of the present invention there is provided an apparatus that includes an optical splitter to spit an output of a multi-line source into a plurality of wavelength reference signals, wherein the multi-line source comprises a plurality of wavelength lines having a fixed spacing there between, and each wavelength reference signal comprises the plurality of wavelength lines. The apparatus also includes at least one combiner to combine at least one wavelength reference signal of the plurality of wavelength reference signals with a respective optical channel of a plurality of optical channels. The apparatus also includes at least one analyzer to determine, for the at least one wavelength reference signal, a wavelength offset between a center wavelength of the respective optical channel and a corresponding wavelength line of the plurality of wavelength lines. The apparatus also includes a laser controller to tune the center wavelength of the respective optical channel based on the wavelength offset of the respective optical channel.

In some embodiments, the corresponding wavelength line is a wavelength line of the plurality of wavelength lines that is closest to the center wavelength of the respective optical channel.

In some embodiments, the at least one analyzer is configured to determine a beating frequency between the respective optical channel and the corresponding wavelength line of the plurality of wavelength lines.

In some embodiments, the laser controller is configured to tune the center wavelength of the respective optical channel to reduce the beating frequency between the respective optical channel and the corresponding wavelength line of the plurality of wavelength lines.

In some embodiments, the laser controller is configured to tune the center wavelength of the respective optical channel to a predefined value for beating frequency between the respective optical channel and the corresponding wavelength line of the plurality of wavelength lines.

In some embodiments, the at least one combiner includes a first combiner to combine a first wavelength reference signal of the plurality of wavelength reference signals with a first optical channel of the plurality of optical channels and a second combiner to combine a second wavelength reference signal of the plurality of wavelength reference signals with a second optical channel of the plurality of optical channels. The at least one analyzer includes a first analyzer to determine, for the first wavelength reference signal, a first wavelength offset between a center wavelength of the first optical channel and a first wavelength line of the plurality of wavelength lines and a second analyzer to determine, for the second wavelength reference signal, a second wavelength offset between a center wavelength of the second optical channel and a second wavelength line of the plurality of wavelength lines.

In some embodiments, the multi-line source comprises a comb laser or a comb generator.

According to one aspect of the present invention there is provided a method that includes modulating at least one optical channel of a plurality of optical channels. The modulation includes modulating a first in-band pilot tone within a first portion of a spectrum of a respective optical channel and modulating a second in-band pilot tone within a second portion of the spectrum of the respective optical channel. Following the modulation, the method includes processing each optical channel of the plurality of optical channels using a frequency discrimination device. Following the processing, the method includes determining, for the at least one optical channel, a wavelength offset between a center wavelength of the at least one optical channel and a corresponding transmission peak of the frequency discrimination device based in part on a relationship between the first and second in-band pilot tones. The method also includes tuning the center wavelength of the at least one optical channel based on the wavelength offset for the at least one optical channel.

In some embodiments, tuning the center wavelength of the at least one optical channel comprises tuning a laser source associated with the at least one optical channel.

In some embodiments, tuning the center wavelength of the at least one optical channel comprises tuning the center wavelength of the at least one optical channel to reduce the wavelength offset for the at least one optical channel.

In some embodiments, tuning the center wavelength of the at least one optical channel comprises tuning the center wavelength of the at least one optical channel to adjust the wavelength offset for the at least one optical channel to a predetermined value.

In some embodiments, the method further includes following the modulating and before the processing, combining the plurality of optical channels.

In some embodiments, determining the wavelength offset based in part on a relationship between the first and second in-band pilot tones comprises determining a difference between a power associated with the first in-band pilot tone and a power associated with the second in-band pilot tone.

In some embodiments, processing each optical channel of the plurality of optical channels using the frequency discrimination device comprises processing each optical channel of the plurality of optical channels using an etalon.

In some embodiments, processing each optical channel of the plurality of optical channels using the frequency discrimination device comprises processing each optical channel of the plurality of optical channels using a frequency discrimination device with a finesse of at least 10.

In some embodiments, modulating the at least one optical channel of the plurality of optical channels includes modulating a first optical channel of the plurality of optical channels and modulating a second optical channel of the plurality of optical channels. Modulating the first in-band pilot tone within the first portion of the spectrum of the respective optical channel includes modulating the first in-band pilot tone within a first portion of the spectrum of the first optical channel and modulating a third in-band pilot tone within a first portion of the spectrum of the second optical channel. Modulating the second in-band pilot tone within the second portion of the spectrum of the respective optical channel includes modulating the second in-band pilot tone within a second portion of the spectrum of the first optical channel and modulating a fourth in-band pilot tone within a second portion of the spectrum of the second optical channel. Determining the wavelength offset between the center wavelength of the at least one optical channel and the corresponding transmission peak of the frequency discrimination device based in part on a relationship between the first and second in-band pilot tones includes determining a first wavelength offset between a center wavelength of the first optical channel and a first transmission peak of the frequency discrimination device based in part on a relationship between the first and second in-band pilot tones and determining a second wavelength offset between a center wavelength of the second optical channel and a second transmission peak of the frequency discrimination device based in part on a relationship between the third and fourth in-band pilot tones.

In some embodiments, modulating the first in-band pilot tone within the first portion of the spectrum of the respective optical channel includes modulating the first in-band pilot tone within a first half of the spectrum of the respective optical channel and modulating the second in-band pilot tone within the second portion of the spectrum of the respective optical channel includes modulating the second in-band pilot tone within a second half of the spectrum of the respective optical channel.

According to one aspect of the present invention there is provided an apparatus including at least one modulator to modulate at least one optical channel of a plurality of optical channels. The at least one modulator is configured to modulate a first in-band pilot tone within a first portion of a spectrum of a respective optical channel and modulate a second in-band pilot tone within a second portion of the spectrum of the respective optical channel. The apparatus also includes a frequency discrimination device having an input coupled to an output of the at least one modulator, the frequency discrimination device being configured to process each optical channel of the plurality of optical channels. The apparatus also includes an analyzer having an input coupled to an output of the frequency discrimination device, the analyzer being configured to determine a wavelength offset between a center wavelength of the at least one optical channel and a corresponding transmission peak of the frequency discrimination device based in part on a relationship between the first and second in-band pilot tones. The apparatus also includes a laser controller to tune the center wavelength of the at least one optical channel based on the wavelength offset of the at least one optical channel.

In some embodiments, the laser controller is configured to tune the center wavelength of the at least one optical channel to reduce the wavelength offset for the at least one optical channel.

In some embodiments, the laser controller is configured to tune the center wavelength of the at least one optical channel to adjust the wavelength offset for the at least one optical channel to a predetermined value.

In some embodiments, the at least one modulator is a plurality of modulators and the apparatus further includes a combiner having a plurality of inputs, each input being coupled to a respective output of the plurality of modulators, and further having an output coupled to the input of the frequency discrimination device, the combiner being configured to combine the outputs of plurality of modulators.

In some embodiments, the analyzer is configured to determine a difference between a power associated with the first in-band pilot tone and a power associated with the second in-band pilot tone.

In some embodiments, the frequency discrimination device comprises an etalon.

In some embodiments, a finesse of the frequency discrimination device is at least 10.

In some embodiments, the at least one modulator includes a first modulator that modulates the first in-band pilot tone within a first portion of a spectrum of a first optical channel and modulates a third in-band pilot tone within a first portion of a spectrum of a second optical channel. The at least one modulator includes a second modulator that modulates the second in-band pilot tone within a second portion of the spectrum of the first optical channel and modulates a fourth in-band pilot tone within a second portion of the spectrum of the second optical channel. The analyzer is further configured to determine a first wavelength offset between a center wavelength of the first optical channel and a first transmission peak of the frequency discrimination device based in part on a relationship between the first and second in-band pilot tones and determine a second wavelength offset between a center wavelength of the second optical channel and a second transmission peak of the frequency discrimination device based in part on a relationship between the third and fourth in-band pilot tones.

In some embodiments, the first portion of the spectrum is a first half of the spectrum and the second portion of the spectrum is a second half of the spectrum.

Benefits of some of these embodiments include improved monitoring and control means for multiple laser sources to reduce relative wavelength drift between different laser sources.

BRIEF DESCRIPTION OF THE DRAWINGS

Embodiments of the disclosure will now be described with reference to the attached drawings in which.

DETAILED DESCRIPTION

Figure 1:
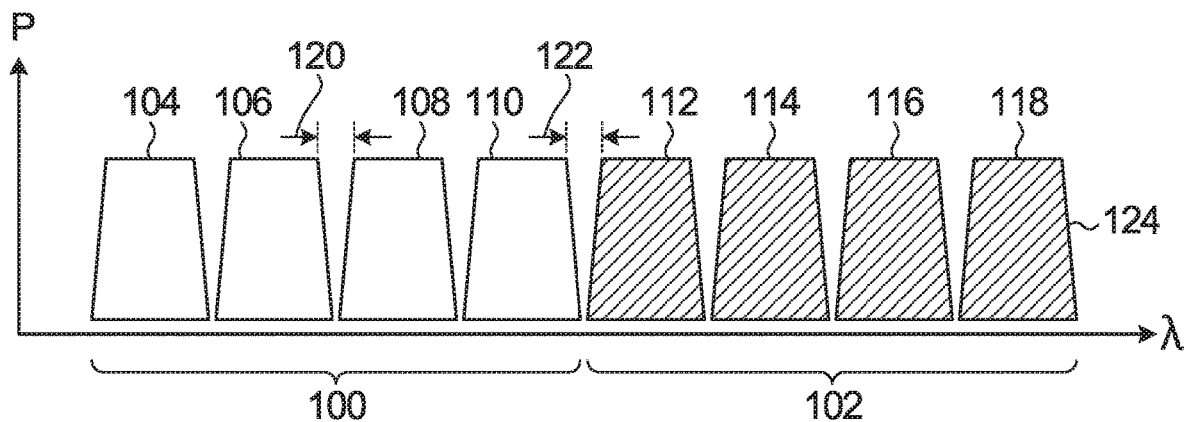
FIG. 1 is a plot illustrating an example of two super-channels.

Generally, embodiments of the present disclosure provide a method and apparatus for multi-laser wavelength control. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

In wavelength division multiplexing (WDM) optical communications, there could be approximately 100 optical channels carried on a single fiber. The capacity of a channel is largely determined by the required reach and achievable baud rate. The required reach may be determined by the channel's signal-to-noise ratio (SNR). The achievable baud rate is limited by the available bandwidth of the analog components, such as transmitter components including digital-to-analog converters (DACs), electrical drivers and electro-optical (EO) modulators, and receiver components including photodiodes (PDs), trans-impendence amplifiers (TIAs), automatic gain controllers (AGCs), and analog-todigital converters (ADC). For long-haul transmissions (a few hundred kilometers and beyond), the capacity of a single channel is approximately 200 Gbit/s. Achieving capacities greater than 200 Gbit/s per WDM channel may be achieved through the use of multiple carriers that are aggregated to form a single WDM interface. This is referred to as a super-channel.

A super-channel is one means to increase channel capacity beyond what may be realizable by a single carrier. Super-channels may also increase spectrum efficiency in WDM systems. For example, within a super-channel, there is no optical filtering between composing channels. Thus, a guard band between the constituent channels of a super-channel is not needed to mitigate the optical filtering effect. The guard bands within a super-channel are only used to mitigate crosstalk between the composing channels. Therefore, the guard bands between the constituent channels of a super-channel can potentially be reduced compared to the guard bands between conventional WDM channels.

FIG. 1 is a plot illustrating an example of two super-channels. The x-axis represents wavelength (A) and the y-axis represents power (P). FIG. 1 includes super-channel 100, which includes channels 104, 106, 108 and 110. FIG. 1 further includes super-channel 102, which includes channels 112, 114, 116 and 118. Although super-channels 100 and 102 are illustrated as consisting of four channels, in general a super-channel may include any number of constituent channels.

The high-wavelength edge of channel 118 is illustrated with a spectrum roll-off 124. A similar spectrum roll-off may exist on the low-wavelength edge of channel 118. The other channels 104, 106, 108, 110, 112, 114 and 116 of FIG. 1 may also experience a spectrum roll-off similar to channel 118.

Channels 106 and 108 are separated by guard band 120. In some embodiments, the guard bands between channels 104 and 106, channels 108 and 110, channels 112 and 114, channels 114 and 116, and channels 116 and 118 are equivalent to guard band 120. Channels 110 and 112 are separated by guard band 122. Super channels 100 and 102 are also considered to be separated by guard band 122.

The guard band 120 has a smaller width than guard band 122. The larger width of guard band 122 may be implemented to compensate for optical filtering between super-channel 100 and super-channel 102. No optical filtering occurs between channels 106 and 108 because they are both within the super-channel 100. This allows for the smaller width of guard band 120, and may improve the spectral efficiency of the super-channel 100.

The guard band 120 may be implemented to prevent excessive crosstalk between the channels 106 and 108. A significant contributor to the crosstalk between adjacent channels within a super-channel is relative wavelength drift between the different lasers that generate the channels. In some embodiments, laser wavelength drift for a channel is specified as +/−2.5 GHz. The width of guard band 120 may be selected based on the expected laser wavelength drift for the channels 106 and 108. Reducing the wavelength drift of the composing lasers for the channels 106 and 108 is one method for reducing the required width of guard band 120, and therefore increasing spectral efficiency in the super-channel 100. Similar comments also apply to channels 104 and 106, channels 108 and 110, channels 112 and 114, channels 114 and 116, and channels 116 and 118.

According to some aspects of the present disclosure, multi-line sources are implemented to reduce relative wavelength drift between adjacent channels. A multi-line source produces multiple wavelength lines with a fixed spacing there between. Each wavelength line represents a relatively narrow linewidth peak in the output spectrum of the multi-line source. The multi-line source may also be referred to as a multi-wavelength source or a frequency-comb source.

Multi-Line Sources

One example of a multi-line source is a comb laser, such as a quantum dot laser. The multiple wavelength lines produced by a quantum dot laser may also be referred to as multiple laser lines. The spacing between the adjacent wavelength lines for a quantum dot laser can be designed to be any value. For example, the spacing between wavelength lines may be 50 GHz. There is very little relative frequency shift between adjacent wavelength lines in a quantum dot laser. If one wavelength line of the quantum dot laser shifts, each of the other wavelength lines of the quantum dot laser will also shift by an equivalent amount. In this sense, the spacing between adjacent wavelength lines in a quantum dot laser may be considered to be fixed.

Figure 2:
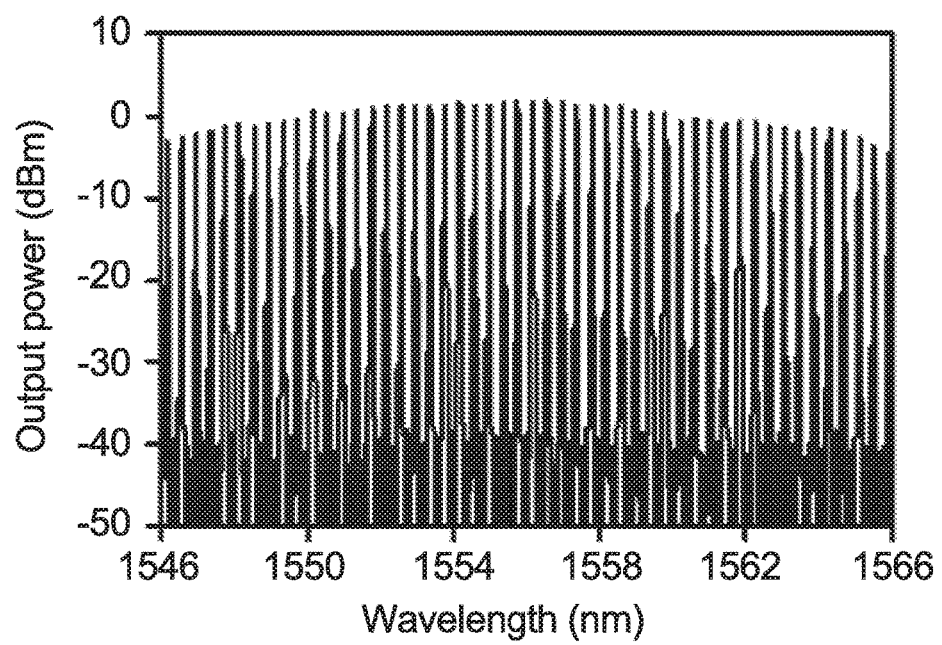
FIG. 2 is a plot illustrating an example output spectrum for an InAs/InP quantum dot laser.

FIG. 2 is a plot illustrating an example output spectrum for an InAs/InP quantum dot laser. The x-axis of FIG. 2 represents the output wavelength of the quantum dot laser, and the y-axis represents the power of the quantum dot laser at each wavelength. FIG. 2 illustrates multiple peaks in the output spectrum of the quantum dot laser, where each peak constitutes a wavelength line. The spacing between adjacent wavelength lines is fixed by virtue of the quantum dot laser.

In some cases, quantum dot lasers may be implemented as multi-line sources to produce the constituent channels of a super-channel. In these cases, each wavelength line of the quantum dot laser forms a constituent channel of a super-channel. The fixed spacing between adjacent wavelength lines of the quantum dot laser reduces the relative wavelength drift between adjacent channels in the super-channel. Therefore, the guard bands between adjacent channels in the super-channel may be reduced, improving spectral efficiency. Quantum dot lasers could also be implemented to produce channels that do not belong to a super-channel.

However, there are potential drawbacks associated with implementing quantum dot lasers as multi-line sources in telecommunications systems. For example, there are relatively few commercial quantum dot lasers available, and the cost of quantum dot lasers is relatively high. Moreover, the output power of quantum dot lasers may be relatively low. This low power may render quantum dot lasers unsuitable for use as optical channel sources that require a high optical signal-to-noise ratio (©SNR).

Another example of a multi-line source is a comb generator. In a comb generator, multiple wavelength lines are generated using one laser source, which may be referred to as the seed channel. Harmonics of the seed channel are generated to form the multiple wavelength lines. The spacing between the adjacent wavelength lines produced by the comb generator could be fixed.

Figure 3:
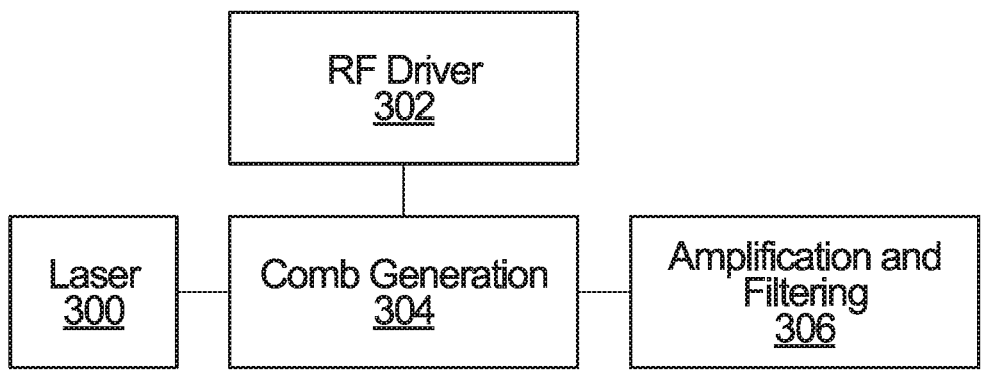
FIG. 3 is a block diagram illustrating an example of a comb generator.

FIG. 3 is a block diagram illustrating an example of a comb generator. FIG. 3 includes a laser 300, a radio frequency (RF) driver 302, an comb generator 304, and an amplification and filtering module 306. The outputs of the laser 300 and the RF driver 302 are connected to respective inputs in the comb generator 304. The output of the comb generator 304 is connected to the amplification and filtering module 306.

The laser 300 produces a seed channel with a single wavelength line. The laser 300 may be an external cavity laser. However, any suitable laser source may be used. The laser 300 provides the seed channel to the comb generator 304. The comb generator 304 may be an on-chip comb generator. The comb generator 304 modulates the seed channel to produce side bands in the spectrum of the channel. These side bands include pairs of wavelength lines centered about the wavelength line of the seed channel. The output of the comb generator 304 includes two wavelength line pairs. However, different numbers of wavelength line pairs may be generated in other examples of comb generators.

The RF generator 302 produces sinusoidal RF signals to drive the comb generator 304 to produce the side bands. In some implementations, the comb generator 304 includes a Mach-Zehnder modulator (MZM) fabricated on a silicon photonics platform. The MZM may include multiple phase shifters, each phase shifter being driven by a respective sinusoidal RF signal generated by the RF driver 302.

The amplification and filtering module 306 is implemented to improve the power and quality of the multiple wavelength lines at the output of the comb generator 304. For example, an erbium-doped fiber amplifier (EDFA) may be implemented in the amplification and filtering module 306 to compensate for coupling loss and waveguide propagation loss. A tunable optical bandpass filter may also be implemented after the EDFA to supress out-of-band amplified spontaneous emission (ASE) noise.

Figure 4:
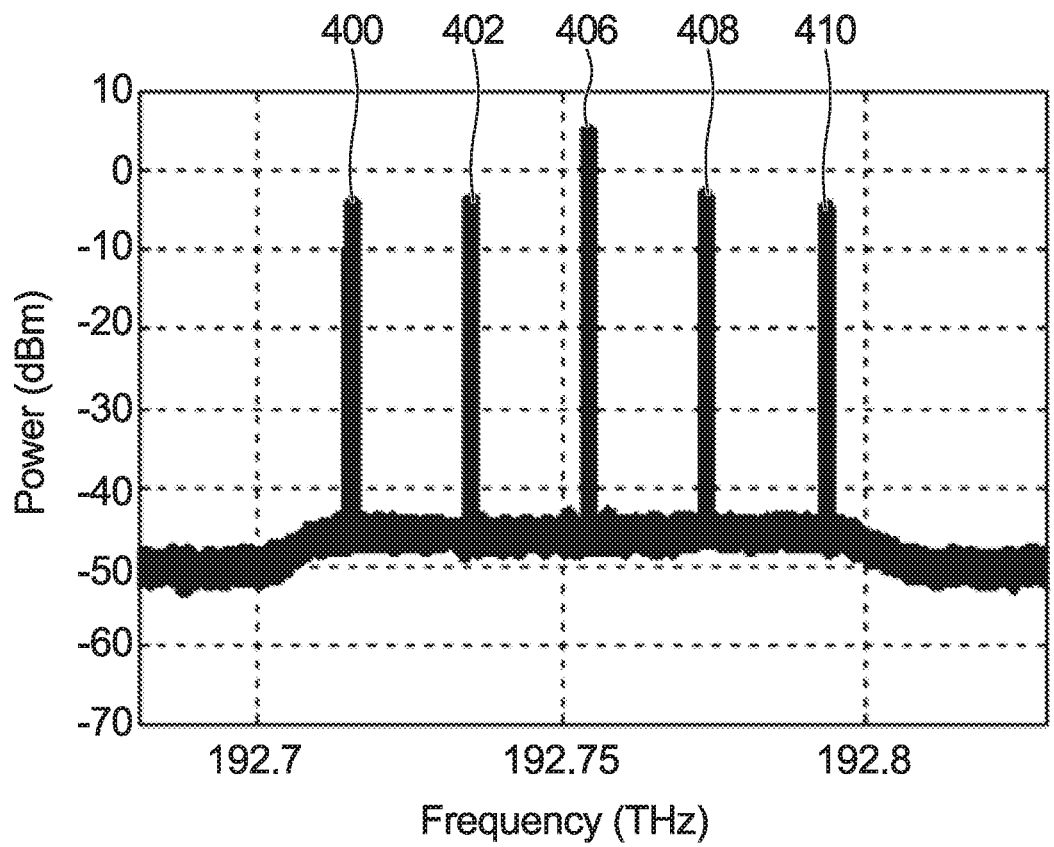
FIG. 4 is a plot illustrating an example output spectrum for the comb generator illustrated in FIG. 3

FIG. 4 is a plot illustrating an example output spectrum for the comb generator illustrated in FIG. 3. The x-axis of FIG. 4 represents the output wavelength of the comb generator, and the y-axis represents the power of the comb generator at each wavelength. FIG. 4 illustrates a wavelength line 406, which corresponds to the seed channel for the comb generator. FIG. 4 also includes wavelength lines 402 and 408, which correspond to a first pair of side bands produced by the comb generator. FIG. 4 further includes wavelength lines 400 and 410, which correspond to a second pair of side bands produced by the comb generator.

The wavelength lines 400, 402, 406, 408 and 410 are spaced by 20 GHz. This spacing of wavelength lines may be produced by a MZM with two phase shifters in the comb generator 304. A first phase shifter is driven at 20 GHz by the RF driver 302, and the second phase shifter is driven at 40 GHz by the RF driver. By carefully controlling the frequencies of the sinusoidal signals produced by the RF driver 302, the comb generator can maintain this fixed spacing of 20 GHz between wavelength lines. However, different spacings between wavelength lines may also be produced by tuning the frequency of the sinusoidal signals.

The wavelength of the seed channel for the comb generator may drift, which will result in all of the wavelengths lines 400, 402, 406, 408 and 410 drifting by an equivalent amount. However, the spacing between wavelengths lines 400, 402, 406, 408 and 410 will be maintained. In this sense, the spacing between the wavelength lines 400, 402, 406, 408 and 410 is decoupled from the actual output wavelength of a laser source.

In some cases, comb generators may be implemented as multi-line sources to produce the constituent channels of a super-channel. In these cases, each wavelength line of the comb generator forms a constituent channel of the super-channel. Fixing the frequency of the sinusoidal waves produced by the RF driver may reduce the wavelength drift between adjacent channels in the super-channel. Therefore, the guard bands between adjacent channels in the super-channel may be reduced, improving spectral efficiency. Comb generators could also be implemented to produce channels that do not belong to a super-channel.

There are potential drawbacks associated with implementing comb generators as multi-line sources to produce the constituent channels of a super-channel. For example, comb generators typically output a relatively low power per wavelength line. Therefore, amplification may be required to produce sufficient power for optical communications. During amplification, ASE noise added to the wavelength lines produced by the comb generator degrades the ©SNR of the wavelength lines. Furthermore, the complexity associated with the different components of comb generators (e.g., comb generators, RF drivers, amplifiers and filters) typically results in comb generators being relatively large in size and expensive. The lack of commercially available comb generators is another potential drawback.

Given the difficulties associated with developing low cost and high power multi-line sources that are suitable for optical communications, it may be desirable to use individual laser sources for each constituent channel of a super-channel. To reduce the wavelength drift between the individual laser sources, methods of laser wavelength control may be implemented. These methods actively monitor and tune the individual lasers that are used to generate the constituent channels of a super-channel, which may reduce the wavelength drift between adjacent channels in the super-channel. Therefore, the guard bands between adjacent channels in the super-channel may be reduced, improving spectral efficiency.

Single Laser Wavelength Control

Figure 5:
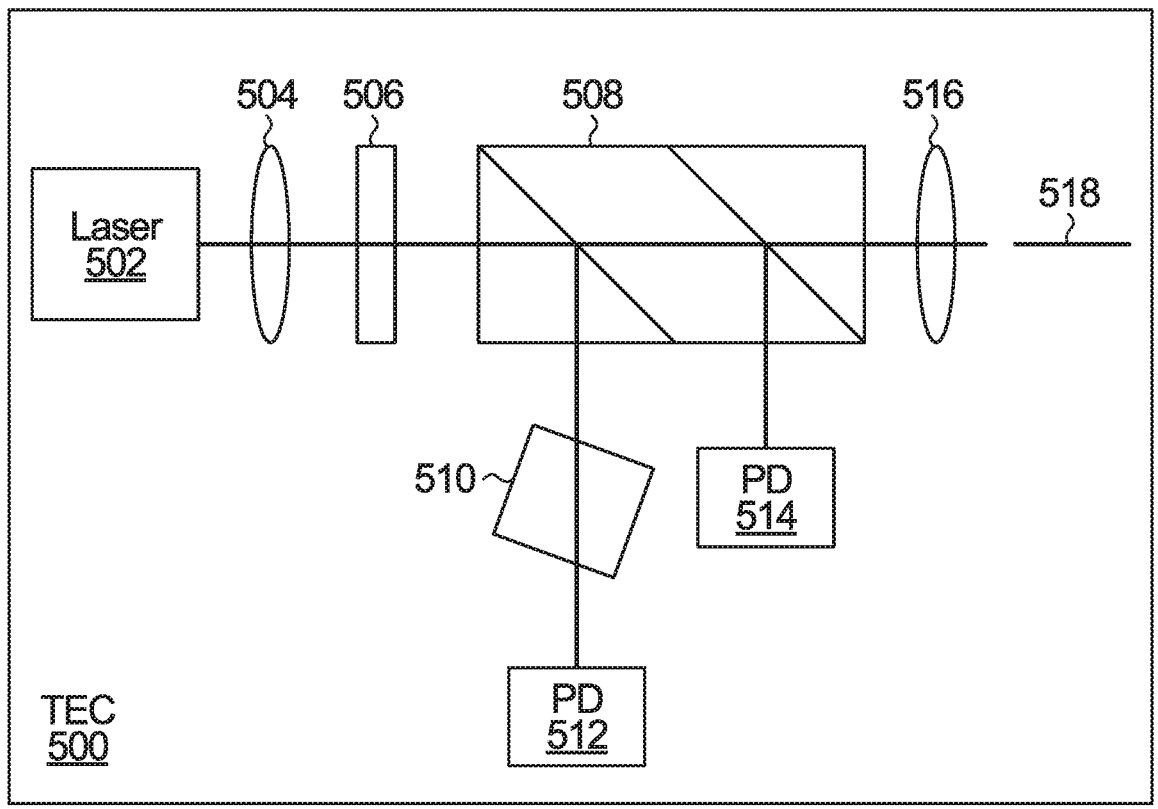
FIG. 5 is a block diagram illustrating an example of a transmitter with single laser wavelength control.

FIG. 5 is a block diagram illustrating an example of a transmitter with single laser wavelength control. FIG. 5 includes a thermo-electrical cooling (TEC) module 500. The TEC module 500 includes a laser 502, a collimating lens 504, an isolator 506, a beam splitter 508, an etalon 510 and photodetectors (PDs) 512 and 514. FIG. 5 further includes a focusing lens 516 and a polarization maintaining (PM) fiber 518. The laser 502, the collimating lens 504, the isolator 506, the beam splitter 508, the focusing lens 516 and the PM fiber 518 are all coupled sequentially. The etalon 510 and the PD 512 are coupled sequentially to an output of the beam splitter 508. The PD 514 is coupled to another output of the beam splitter 508. The etalon 510 may more generally be referred to as a frequency discrimination device.

The TEC module 500 may be implemented to ensure that the laser 502, the PDs 512 and 514, and other optical components are maintained at a consistent temperature. This may aid in stabilizing the operation of the laser 502 and the PDs 512 and 514, as well as maintaining the alignment of the system. In some instances it may be possible that there is no temperature control of the optical components by a TEC module if the optical components can be guaranteed to operate with an acceptable variability over a usable temperature range.

The laser 502 produces a single optical channel, which may be a constituent channel for a super-channel. The optical channel includes only one wavelength line. The optical channel traverses the collimating lens 504 to collimate the optical channel. Following the collimating lens 504, the optical channel traverses the isolator 506 to prevent back-reflection of the optical channel into the laser source. Following the isolator 506, the optical channel enters the beam splitter 508. The beam splitter 508 includes two beam splitting stages.

In the first stage of the beam splitter 508, a portion of the optical channel is deflected to the etalon 510. An etalon is a passive optical component with periodic power transmission as a function of wavelength/frequency. Etalons exhibit multiple transmission peaks with a fixed spacing between each peak. An etalon typically consists of parallel reflecting surfaces. The power transmission through an etalon is related to the phase difference $\delta(\lambda)$ accumulated by a signal over a round-trip pass of the etalon (i.e., propagating from the first reflecting surface to the second reflecting surface, and then back to the first reflecting surface). The power transmission may be expressed as:

$$T(\lambda) = \frac{1}{1 + F\sin^2\left(\frac{\delta(\lambda)}{2}\right)}. \quad (1)$$

The phase difference may be expressed as:

$$\delta(\lambda) = \frac{2\pi}{\lambda} 2 n l \cos(\theta). \quad (2)$$

In equations (1) and (2), 1 is the cavity length, θ is the angle at which the signal enters the etalon, λ is the wavelength of the signal, n is the refractive index of the material between the reflecting surfaces of the etalon, and F the finesse of the etalon. The etalon 510 is a relatively low finesse etalon (e.g., a finesse of less than 10).

As the optical channel traverses the etalon 510, frequency components of the optical channel that align with a transmission peak of the etalon 510 experience relatively little loss. In contrast, frequency components of the optical channel that do not align with a transmission peak of the etalon 510 are attenuated. In this sense, the etalon 510 performs frequency-selective filtering. Following the etalon 510, the power of the optical channel is measured using the PD 512. Due to filtering of the optical channel in the etalon 510, the PD 512 substantially measures the portion of the spectrum of the laser 502 that overlaps with the transmission peaks of the etalon 510. The measurement performed by the PD 512 may be considered a wavelength monitoring measurement.

In the second stage of the beam splitter 508, a portion of the optical channel is deflected to the PD 514. The PD 514 measures the power of the entire spectrum of the laser 502. The measurement performed by the PD 514 may be considered a reference measurement.

A portion of the optical channel passes through the beam splitter 508. This portion traverses to the focusing lens 516. The focusing lens 516 focuses the optical channel into the PM fiber 518. The PM fiber 518 may form part of an optical network that carries the optical channel to a destination. In some cases, only a small portion of the optical channel may be split by the beam splitter 508 and is monitored by PD 512 and PD 514. Thus, a large portion of the power output from the laser 502 is available for data transmission.

Using the apparatus of FIG. 5, the center wavelength of the laser 502, and therefore the optical channel, may be monitored and controlled. In cases where the bandwidth of a laser is relatively narrow, the center wavelength of the laser may be considered to be simply the wavelength of the laser. In one implementation, the laser 502 is tuned based on the ratio between the measurement at the PD 512 and the measurement at the PD 514. If the wavelength of the laser 502 is aligned with a transmission peak of the etalon 510, then this ratio will approach a maximum. If the wavelength of the laser 502 is aligned with a transmission trough of the etalon 510, then this ratio will approach a minimum. The laser 502 may be tuned to approach a pre-defined value for this ratio. For example, the laser 502 may be tuned to approach a 50% transmission point for the elation 510. In some implementations, the wavelength of the laser 502 may be controlled with an accuracy of +/−2.5 GHz using this method.

The combination of the beam splitter 508, the etalon 510 and the PDs 512 and 514 may be considered to be a wavelength locker. Multiple wavelength lockers could be implemented to control the wavelengths of the optical channels within a super-channel, where each optical channel is controlled with a respective wavelength locker. However, there are potential drawbacks associated with controlling multiple optical channels using different wavelength lockers. These drawbacks include variability between the different wavelength lockers. For example, using the wavelength locker of FIG. 5, variability may arise due to inconsistencies in the position of transmission peaks between different etalons. As a result, it may be difficult to maintain a consistent spacing between the outputs of various wavelength lockers as the center wavelengths of the wavelength lockers can drift in different directions as the wavelength lockers are independently controlled. A need exists for methods of multi-laser wavelength control with reduced variability and improved wavelength control accuracy.

Multi-Laser Wavelength Control

Some aspects of the present invention relate to methods and apparatus for multi-laser wavelength control using a multi-line source as a wavelength reference. According to these aspects, the constituent channels of a super-channel may be produced by multiple independent lasers. A multi-line source is implemented as a wavelength reference for the multiple independent lasers, where each laser is locked to one wavelength line of the multi-line source. To achieve wavelength locking, the multi-line source is power split, creating multiple wavelength reference signals. Each wavelength reference signal includes the multiple wavelength lines produced by the multi-line source. The wavelength reference signals are then combined with a small portion of power from a respective independent laser. A relatively low speed detection circuit is used to measure the beating frequency between each optical channel and the corresponding wavelength line from the multi-line source. The beating frequency is an indicator of the wavelength offset between the wavelength of the respective independent laser and a wavelength line of the multi-line source. Wavelength offset is analogous to frequency offset. Tuning the respective independent laser to reduce this beating frequency may lock the center wavelength of the optical channel to the corresponding wavelength line.

Figure 6:
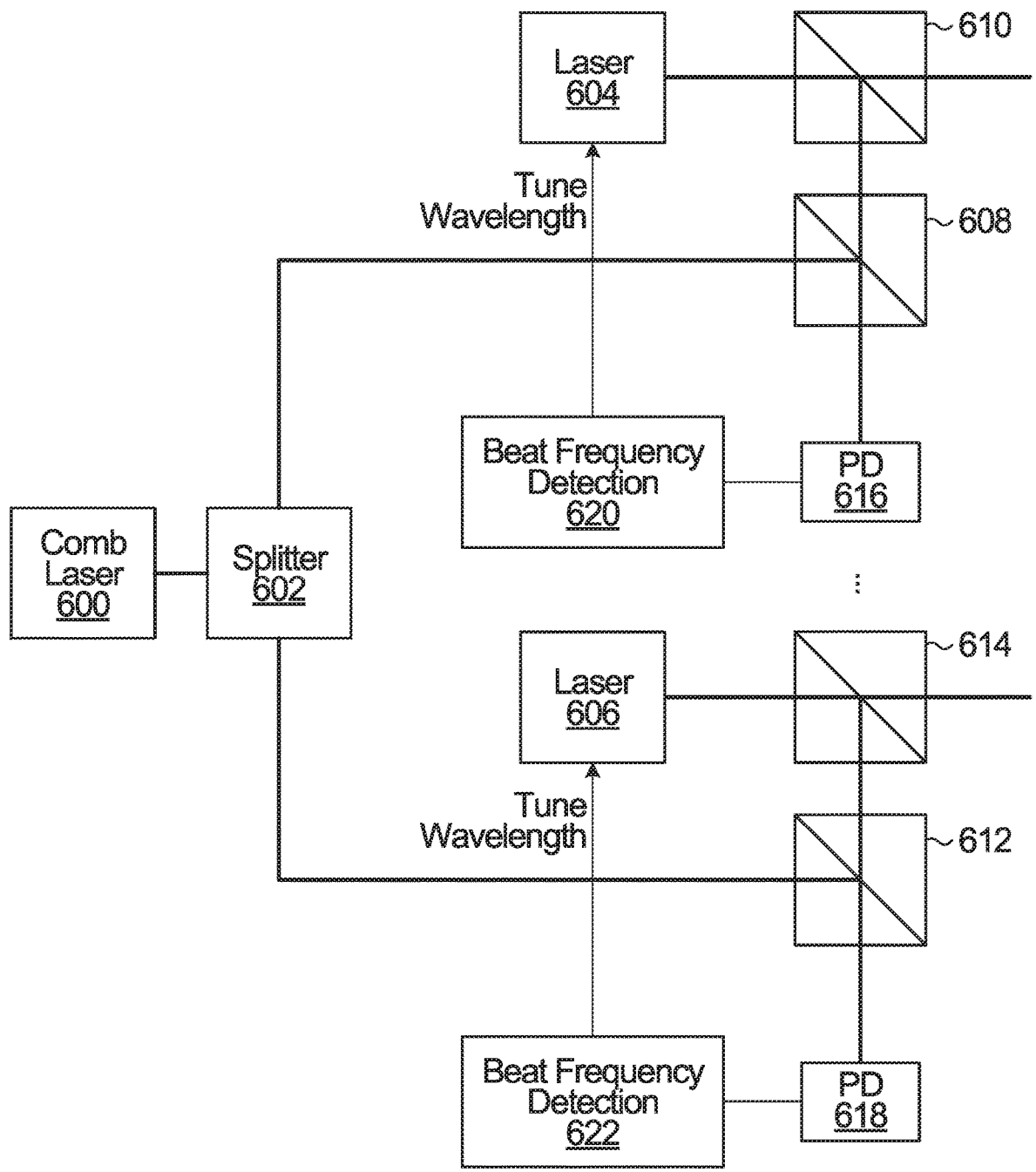
FIG. 6 is a block diagram illustrating a transmitter with multi-laser wavelength control using a multi-line source according to one embodiment.

Referring to FIG. 6, shown is a block diagram illustrating a transmitter with multi-laser wavelength control using a multi-line source according to one embodiment. FIG. 6 includes a comb laser 600, a power splitter 602, lasers 604 and 606, beam splitters 608, 610, 612 and 614, PDs 616 and 618, and beat frequency detectors 620 and 622. The output of the comb laser 600 is coupled to the power splitter 602. The outputs of the power splitter 602 are coupled to the beam splitters 608 and 612. The output of the laser 604 is coupled to the beam splitter 610. One of the outputs of the beam splitter 610 is coupled to the beam splitter 608. An output of the beam splitter 608 is coupled to the PD 616. The output of the PD 616 is coupled to the beat frequency detector 620, which is coupled to the laser 604. The laser 606, beam splitters 612 and 614, PD 618 and beat frequency detector 622 are connected in an similar manner.

Although FIG. 6 is described in the context of free-space optics, it is also possible to implement FIG. 6 using guided-wave optics.

The comb laser 600 is a multi-line source that produces multiple wavelength lines with a fixed spacing. In some implementations, the comb laser 600 is similar to the quantum dot laser discussed above with reference to FIG. 2. The comb laser 600 may instead be a comb generator, such as the comb generator discussed above with reference to FIGS. 3 and 4. In general, any multi-line source may be used for the comb laser 600.

The output of the comb laser 600 is coupled to the power splitter 602. The power splitter 602 is an optical power splitter that divides the output of the comb laser 600 into several different wavelength reference signals. Each wavelength reference signal contains a portion of the power and all of the wavelength lines produced by the comb laser 600. No demultiplexing is performed to separate the wavelength lines of the comb laser 600 at the power splitter 602. One of the wavelength reference signals is directed towards the beam splitter 608 and another of the wavelength reference signals is directed towards the beam splitter 612. In general, the power splitter 602 may have any number of outputs, although only two are illustrated in FIG. 6 for clarity.

The laser 604 produces a single optical channel, which may be a constituent channel of a super-channel. The optical channel contains a single wavelength line. In some implementations, the laser 604 may be integrated on the same chip as the laser 606 and any number of additional lasers. The optical channel generated by the laser 604 is coupled to the beam splitter 610, where a portion of the power of the optical channel is deflected towards the beam splitter 608. The remainder of the power in the optical channel passes through the beam splitter 610 and may be used for data communication in an optical network. The laser 604 may modulate the optical channel with data. Alternatively, an external optical modulator (not shown) may be implemented to modulate the optical channel. The external optical modulator may be implemented within the apparatus of FIG. 6, or in a different section of the optical network.

The optical channel from the laser 604 and a wavelength reference signal from the power splitter 602 are combined in the beam splitter 608. In this sense, the beam splitter 608 acts as a combiner. The combined signal is then coupled to and measured by the PD 616. The beat frequency detector 620 monitors the output of the PD 616 for beating. If the wavelength of the optical channel and a corresponding wavelength line of the wavelength reference signal are relatively close (e.g., within 2 GHz), then the beat frequency detector 620 may be able to detect beating in the combined signal.

The beat frequency detectors 616 and 618 are relatively low speed detection circuits, which may be implemented in whole or in part in hardware, firmware, one or more components that execute software, or some combination thereof. The combination of the PD 616 and the beat frequency detector 620 may be considered to be an analyser. An example of a beat frequency detection algorithm that may be used by the beat frequency detectors 616 and 618 is described in "Optical beat-note frequency stabilization between two lasers using a radio frequency interferometer in the gigahertz frequency band" (Optical Engineering, 53(12), 124109 (2014). https://doi.org/10.1117/1.OE.53.12.124109), which is incorporated by reference herein.

The wavelength of laser 604 may be tuned by a laser controller (not shown) based on the determined beating frequency from the beat frequency detector 620. In FIG. 6 the laser controller is a component of the laser 604. However, in other embodiments, the laser controller may be a separate component from the laser 604. Wavelength tuning in the laser 604 may be performed using thermal tuning or carrier injection. The tuning current applied to laser 604 is controlled using the laser controller. In some implementations of FIG. 6, the laser 604 is tuned to reduce the beating frequency. This tuning will lock the wavelength of the laser 604 to the corresponding wavelength line of the wavelength reference signal. In other implementations, the laser 604 is tuned to approach a predefined value of beating frequency.

The tuning of the laser 606, which is performed in a similar manner to the tuning of the laser 604, uses a different wavelength reference signal from the power splitter 602. In most cases, the wavelength of the laser 606 will be locked to a different wavelength line of the comb laser 600. Any number of additional lasers (not shown) may also be tuned using other wavelength lines of the comb laser 600 and other wavelength reference signals output from the power splitter 602. The fixed spacing between the multiple wavelength lines of the comb laser 600 may ensure that the different lasers are tuned for an even wavelength spacing. Laser tuning using a multi-line source is explained in more detail below with reference to FIG. 7.

Figure 7:
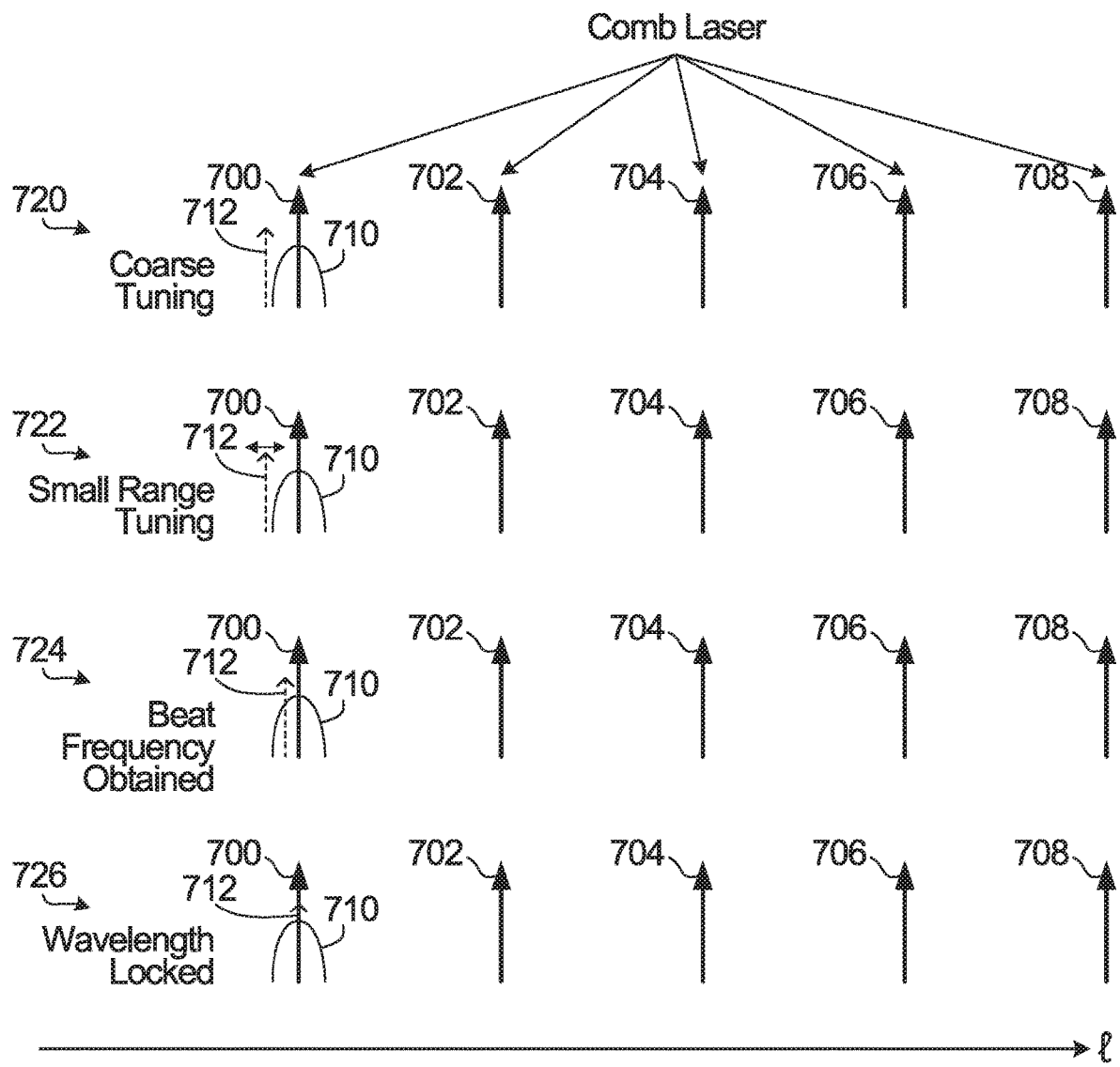
FIG. 7 is a series of plots illustrating an example of tuning a laser wavelength to a wavelength line of a comb laser.

FIG. 7 is a series of plots illustrating an example of tuning a laser wavelength to a wavelength line of a comb laser. The x-axis of FIG. 7 represents wavelength. FIG. 7 illustrates wavelength lines 700, 702 704, 706 and 708 produced by a comb laser, such as the comb laser 600 discussed above with reference to FIG. 6. However, in other embodiments, the wavelength lines 700, 702 704, 706 and 708 may be produced by another multi-line source, such as a comb generator. While only five wavelength lines are illustrated in the comb laser reference signal, it is to be understood that there may be more or less five. In FIG. 7, with regard to wavelength line 700, there is shown a detection bandwidth 710, as well as a laser wavelength 712 to be tuned to the wavelength of the wavelength line 700. The laser wavelength 712 may be considered to be an optical channel. The tuning process consists of several steps, including a course tuning step 720, a small range tuning step 722, a beat frequency obtained step 724, and a wavelength locked step 726.

In the coarse tuning step 720, the laser wavelength 712 is coarsely tuned towards a desired wavelength using at least one of a calibration table and sweeping the laser wavelength over a range or wavelengths using the laser controller. In the small range tuning step 722, the laser wavelength 712 is tuned to achieve an initial acquisition of a beat frequency by tuning the laser wavelength to within the detection bandwidth 710 of the of the wavelength line 700. The detection bandwidth 710 may be limited by beat frequency detection circuitry, such as the beat frequency detectors 616 and 618 discussed above with reference to FIG. 6. In some embodiments, the detection bandwidth 710 is between 2-3 GHz. In the beat frequency obtained step 726, the beat frequency is measured using the beat frequency detection circuitry. The laser wavelength 712 is then tuned to reduce the beat frequency, thereby reducing the wavelength offset between the laser wavelength and the wavelength line 700. A small frequency dither may be applied to determine the sign of this wavelength offset. In the wavelength locked step 726, the laser wavelength 712 substantially matches the wavelength of the wavelength line 700 within a particular accuracy.

In some implementations, an accuracy of <1 GHz may be suitable for reducing laser wavelength drift in a super-channel. Using the steps illustrated in FIG. 7, laser wavelengths may be tuned to within an accuracy of 200 MHz. In other embodiments, the laser wavelength 712 may tuned to a predetermined offset from the wavelength line 700. In these embodiments, the detection bandwidth 710 should be greater than or equal to this offset.

Although FIG. 7 only illustrates one laser wavelength being tuned, in general, other laser wavelengths may be tuned to the wavelength lines 702, 704, 706 and 708. In some embodiments, one laser wavelength is locked to each of the wavelength lines 700, 702, 704, 706 and 708. Some or all of these laser wavelengths may form the constituent channels of a super-channel.

Advantageously, when performing multi-laser wavelength control using a multi-line source, the power and OSNR of the optical channel are determined by the individual lasers (e.g., lasers 604 and 606 of FIG. 6). Therefore, the power and OSNR can be relatively high compared to what is achievable with multi-line sources. Amplification may or may not be required. In addition, individual lasers may be more compact and cost effective compared to multi-line sources. The comb laser 600 in FIG. 6 is only used as a wavelength reference, and therefore a relatively low power is acceptable. The individual lasers are each tuned based on wavelength reference signals originating from the same multi-line source, and therefore there is little variability between the different wavelength reference signals. In particular, the position of the multiple wavelength lines is the same for each wavelength reference signal. Multi-laser wavelength control using a multi-line source could be implemented to reduce variability in the spacing between optical channels within a super-channel. Multi-laser wavelength control using a multi-line source could also be implemented to produce channels that do not belong to a super-channel. A potential drawback of using the apparatus of FIG. 6 is that different lasers are not phase locked.

Some aspects of the present disclosure relate methods and apparatus for monitoring the wavelengths of multiple optical channels using a single wavelength sensing device. In some embodiments, each optical channel of a super-channel is produced by a laser and an electro-optical modulator, similar to a conventional transmitter. Dual band pilot tones and data can be modulated onto the spectrum of each optical channel.

A pilot tone is a small amplitude and low-frequency modulation (e.g., kHz to MHz) applied to a high-speed optical channel. A pilot tone provides an in-band ancillary channel for performance monitoring. Here, "in-band" refers to the pilot tone being modulated within the frequency resources that are used for modulating data. Conventional pilot tones are applied to an entire channel spectrum, and may be used for optical performance monitoring (OPM) (e.g., to measure the power of a channel). In some cases, different channels are modulated with different pilot tones (frequencies). Accordingly, the power of a particular pilot tone can be useful for indicating the power of an optical channel in a wavelength division multiplexed (WDM) system.

With dual band pilot tones, an optical channel is divided into two frequency bands, a positive frequency band and a negative frequency band, and a different pilot tone frequency is applied within each band. The positive and negative connotations being with respect to either side of the center wavelength. The power of the positive frequency band and the negative frequency band can then be monitored by measuring the amplitudes of the corresponding pilot tones. The pilot tone frequencies can range from 100 kHz-100 MHz. The pilot tone frequencies applied to the same optical channel should be relatively close so that they have a similar detection sensitivity. Dual band pilot tones could be in-band pilot tones. In other words, dual band pilot tones can be modulated on the same frequency bands as data. Modulating in-band pilot tones onto an optical channel does not reduce the spectral efficiency of the channel.

Dual band pilot tones are an example of multi-band pilot tones. Multi-band pilot tones are described in greater detail in U.S. patent application Ser. No. 15/479,666 filed on Apr. 5, 2017, which is incorporated by reference in its entirety herein and assigned to the assignee of the present application. Although many of the embodiments described herein relate to dual band pilot tones, in general, any multi-band pilot tone scheme may be used (e.g., four pilot tone bands) without diverting from the scope of the present disclosure.

Following the modulation of dual band pilot tones, the optical channels are combined using a wavelength division multiplexer or a power coupler. A small portion of the multiplexed channels is tapped, which is processed using an etalon with a high finesse. The etalon is used to determine the optical channel's wavelength offset relative to a transmission peak. The output of the etalon is converted into an electrical signal by a single PD, electrically amplified, and converted into digital signal by an analog-to-digital converter (ADC). A digital signal processor (DSP) is used to extract the pilot tone amplitudes (or powers). In some implementations, the time-domain power waveform measured by the PD is converted to the frequency-domain using a fast Fourier transform (FFT). The pilot tone amplitudes may be extracted from corresponding portions of the frequency-domain spectrum. This allows the signal powers in the positive frequency bands and the negative frequency bands of a channel to be monitored by their corresponding pilot tones using a single pilot tone detector. Multiple channels may also be monitored simultaneously using a single pilot tone detector, provided that a unique pilot tone frequency is used for each channel and each frequency band. The optical channel frequency offset from the transmission peaks of the etalon may then be calculated and used to control the laser wavelength/frequency.

Figure 8:
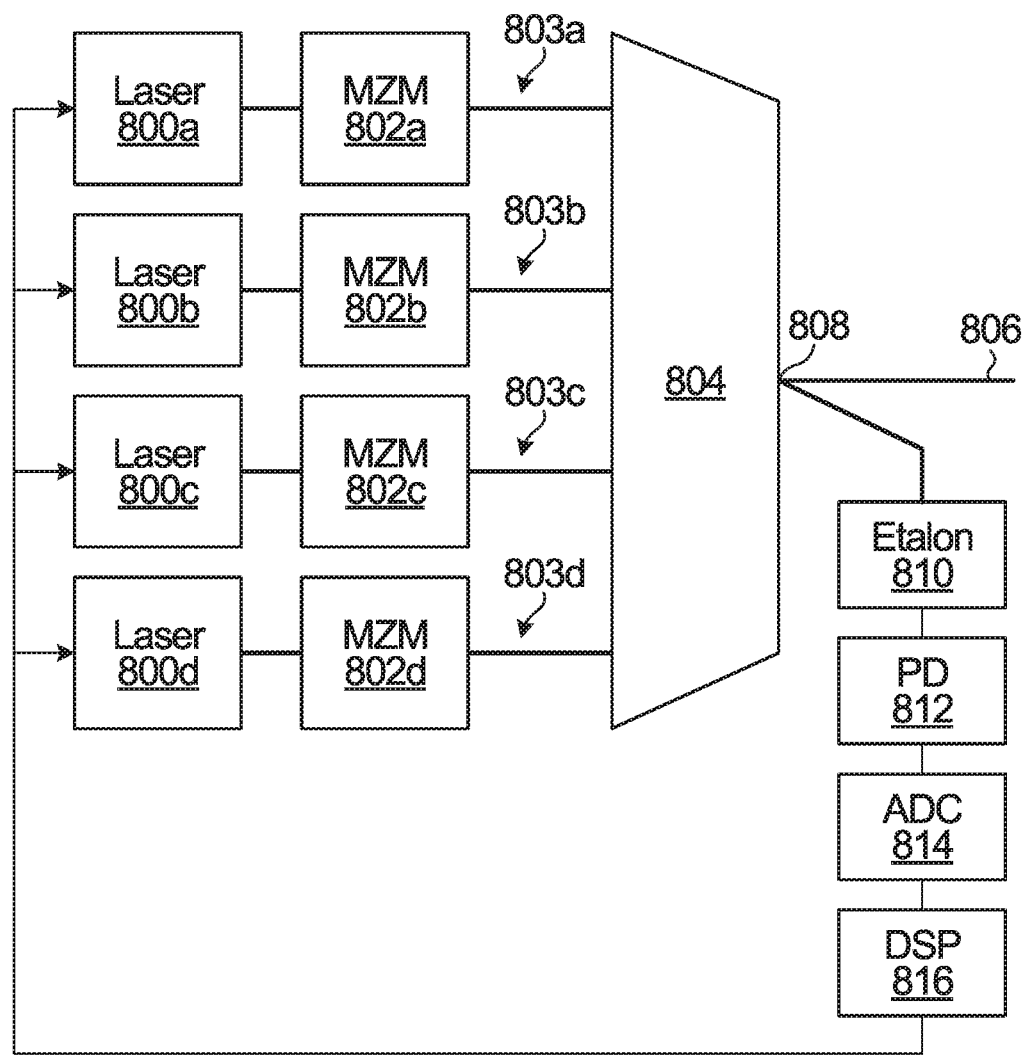
FIG. 8 is a block diagram illustrating a transmitter with multi-laser wavelength control using a single wavelength sensing device according to one embodiment.

FIG. 8 is a block diagram illustrating a transmitter with multi-laser wavelength control using a single wavelength sensing device according to one embodiment. FIG. 8 includes lasers 800a, 800b, 800c and 800d, Mach-Zehnder modulators (MZMs) 802a, 802b, 802c and 802d, a multiplexer 804, an optical output 806, an optical tap 808, an etalon 810, a PD 812, an ADC 814 and a DSP 816. The lasers 800a, 800b, 800c and 800d are coupled to the MZMs 802a, 802b, 802c and 802d, respectively. The output of each of the MZMs 802a, 802b, 802c and 802d, indicated at points 803a, 803b, 803c and 803d, is coupled to the multiplexer 804. The output of the multiplexer 804 is coupled to the optical output 806. The optical output 806 includes the optical tap 808 which is coupled sequentially to the etalon 810, the PD 812, the ADC 814, and the DSP 816. The output of the DSP 816 is fed back to each of the lasers 800a, 800b, 800c and 800d.

Each of the lasers 800a, 800b, 800c and 800d produce a single optical channel. The optical channels from the lasers 800a, 800b, 800c and 800d are modulated by the MZMs 802a, 802b, 802c and 802d, respectively. In some implementations, the MZM 802a modulates data and pilot tones onto the optical signal produced by the laser 800a. In other implementations, data is modulated by the laser 800a, and the pilot tones are modulated by the MZM 802a. The MZMs 802b, 802c and 802d may perform similar operations.

The pilot tones modulated by the MZMs 802a, 802b, 802c and 802d are dual band pilot tones. In some implementations, the modulation depth is between 1% and 5% of the optical channel power, and the modulation frequency is between 100 kHz and 100 MHz. The modulation of dual band pilot tones is discussed in more detail below with reference to FIGS. 9-12.

The optical channels 803a, 803b, 803c and 803d output from the MZMs 802a, 802b, 802c and 802d are multiplexed using the multiplexer 804 onto the optical output 806. One or more of the lasers 800a, 800b, 800c and 800d, the MZMs 802a, 802b, 802c and 802d, and the modulator 804 may be implemented on a single chip. The number of lasers and MZMs illustrated in FIG. 8 is provided by way of example only. In other embodiments, other numbers of laser and MZMs may be provided.

The optical output 806 may be an optical fiber that carries the optical channels within the optical network. The optical output 806 includes an optical tap 808 to couple a portion of each of the optical channels to the etalon 810.

In the embodiment of FIG. 8, the etalon 810 is a high finesse etalon (e.g., an etalon with a finesse greater than 10). The etalon 810 processes each of the channels. Frequency components of the channels that do not align with a transmission peak of the etalon 810 are strongly attenuated compared to frequency components that do align with a transmission peak of the etalon. In this sense, the etalon 810 is a frequency discrimination device. In some implementations, the period of the transmission peaks for the etalon 810 is designed to be the desired channel spacing of channels in a super-channel. In these implementations, the wavelength of each of the optical channels within the super-channel is tuned to align with a transmission peak of the etalon 810.

The output of the etalon 810 is converted to an electrical signal using the PD 812. The ADC 814 converts the output of the PD 812 into a digital signal. The DSP 816 then processes the digital signal to determine a wavelength offset (which is analogous to a frequency offset) between the wavelengths of each of the optical channels and the corresponding transmission peaks of the etalon 810 using the dual band pilot tones, which is discussed in detail below with reference to FIGS. 9-12. The combination of the etalon 810, the PD 812, the ADC 814 and the DSP 816 may be considered to be a wavelength sensing device. The combination of the PD 812, the ADC 814 and the DSP 816 may be considered to be an analyser. The wavelength sensing device or analyser may further include an electrical amplifier (not shown).

The wavelength of the lasers 800a, 800b, 800c and 800d may be tuned using respective laser controllers. The tuning is based on the output of the DSP 816. In FIG. 8, the laser controllers are components of the lasers 800a, 800b, 800c and 800d. However, in other embodiments, a single laser controller may be a separate component used to tune the lasers 800a, 800b, 800c and 800d. Wavelength tuning may be performed using thermal tuning or carrier injection. The tuning current applied to the lasers 800a, 800b, 800c and 800d is controlled using the laser controllers. In some implementations of FIG. 8, the lasers 800a, 800b, 800c and 800d are tuned to reduce the respective wavelength offsets determined by the DSP 816. This tuning will lock the wavelength of the lasers 800a, 800b, 800c and 800d to corresponding transmission peaks of the etalon 810. In other implementations, the lasers 800a, 800b, 800c and 800d are tuned to approach pre-defined values of wavelength offsets.

Figure 9:
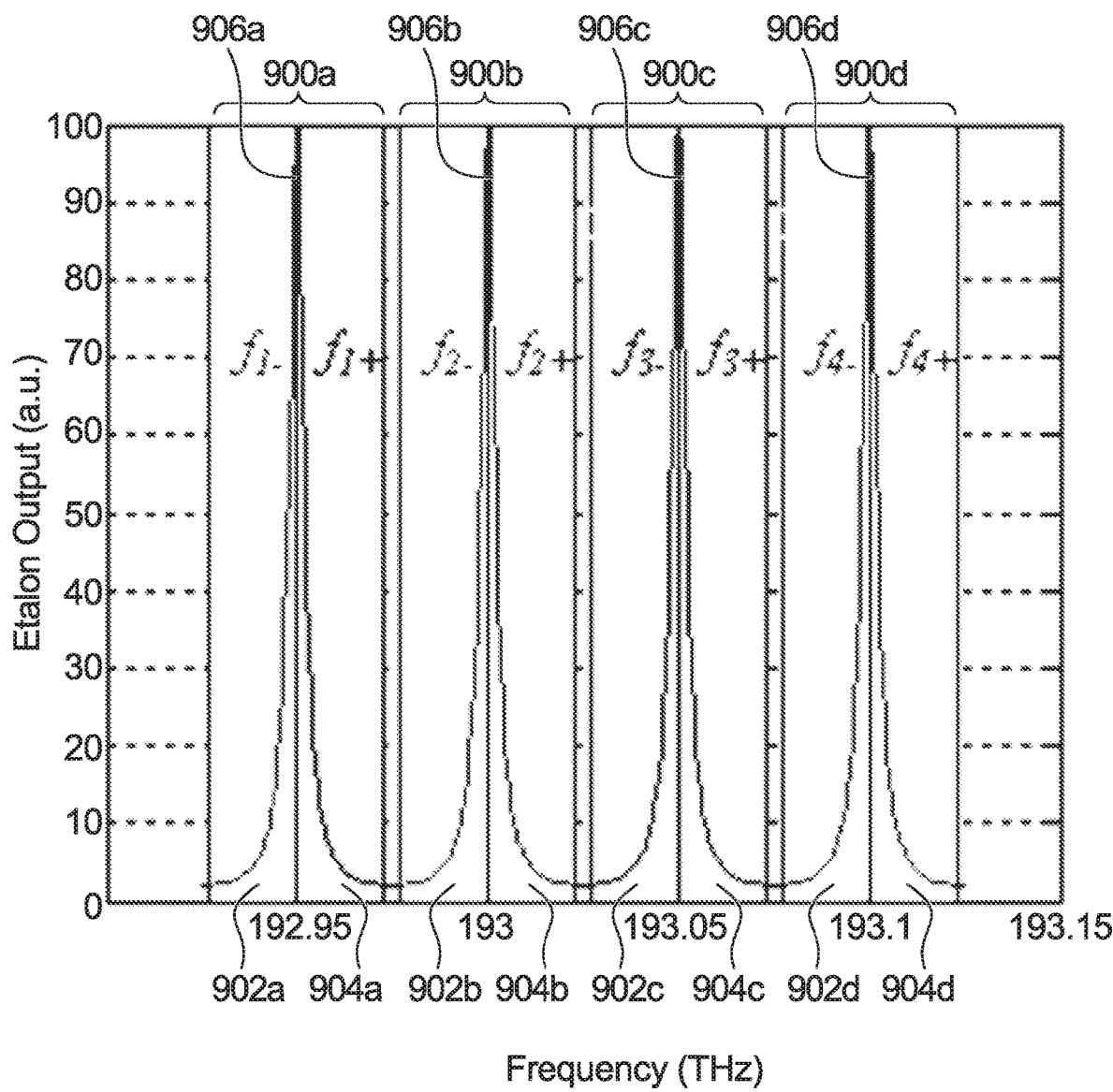
FIG. 9 is a plot illustrating dual band pilot tone modulation that may be used for power monitoring applied to multiple optical channels in relation to the transmission response of an etalon utilized in a wavelength sensing device according to an embodiment.

FIG. 9 is a plot illustrating dual band pilot tone modulation applied to the optical channels and the transmission response of an etalon. The x-axis of FIG. 9 represents frequency in THz and the y-axis represents the etalon transmission in arbitrary units. FIG. 9 illustrates spectra 900a, 900b, 900c, and 900d, where each spectrum corresponds to a different optical channel. The spectra 900a, 900b, 900c, and 900d correspond to the spectral bandwidth output from the MZMs 802a, 802b, 802c and 802d, respectively. In other words, the spectra 900a, 900b, 900c, and 900d correspond to the spectral bandwidth at points 803a, 803b, 803c and 803d in FIG. 8, respectively. FIG. 9 also illustrates negative frequency bands 902a, 902b, 902c and 902d, and positive frequency bands 904a, 904b, 904c and 904d for the spectra 900a, 900b, 900c, and 900d, respectively. FIG. 9 further illustrates transmission peaks 906a, 906b, 906c and 906d, which correspond to the transmission peaks of the etalon 810. The finesse of the etalon 810 is 50. The transmission peaks 906a, 906b, 906c and 906d align with the center of the spectra 900a, 900b, 900c, and 900d, respectively. For example, the center wavelength of the spectrum 900a is represented by the intersection between the negative frequency band 902a and the positive frequency band 904a. The position of the transmission peak 900a corresponds to the intersection of the negative frequency band 902a and the positive frequency band 904a.

Each of the spectra 900a, 900b, 900c, and 900d are modulated with data and dual band pilot tones. For the dual band pilot tone modulation of the spectrum 900a, the negative frequency band 902a is modulated with a pilot tone frequency $f_{1-}$ and the positive frequency band 904a is modulated with a pilot tone frequency $f_{1+}$. The pilot tone frequencies $f_{1-}$ and $f_{1+}$ are relatively close so that they will have similar detection sensitivities at the PD 812. For the dual band pilot tone modulation of the spectrum 900b, the negative frequency band 902b is modulated with a pilot tone frequency $f_{2-}$ and the positive frequency band 904b is modulated with a pilot tone frequency $f_{2-}$. Similar comments apply to the dual band pilot tone modulation for the spectra 900c and 900d.

No two frequency bands are modulated with the same pilot tone frequencies in the embodiment of FIG. 9. Therefore, the power of each frequency band can be uniquely detected using digital processing. In FIG. 9, negative frequency bands and positive frequency bands each include half of the spectrum of an optical channel. However, in other embodiments, negative frequency bands and positive frequency bands may include other portions of the spectrum of an optical channel.

FIG. 9 also illustrates the transmission peaks 906a, 906b, 906c and 906d of the etalon 810. The width of the transmission peak 906a is smaller than the width of the spectrum 900a. Therefore, a portion of the spectrum 900a from point 803a in FIG. 8 will be filtered during processing by the etalon 810. This filtering can be used to determine the wavelength offset between the center wavelength of the spectrum 900a and the transmission peak 906a, which is explained in more detail below with reference to FIGS. 10 and 11.

Figure 10:
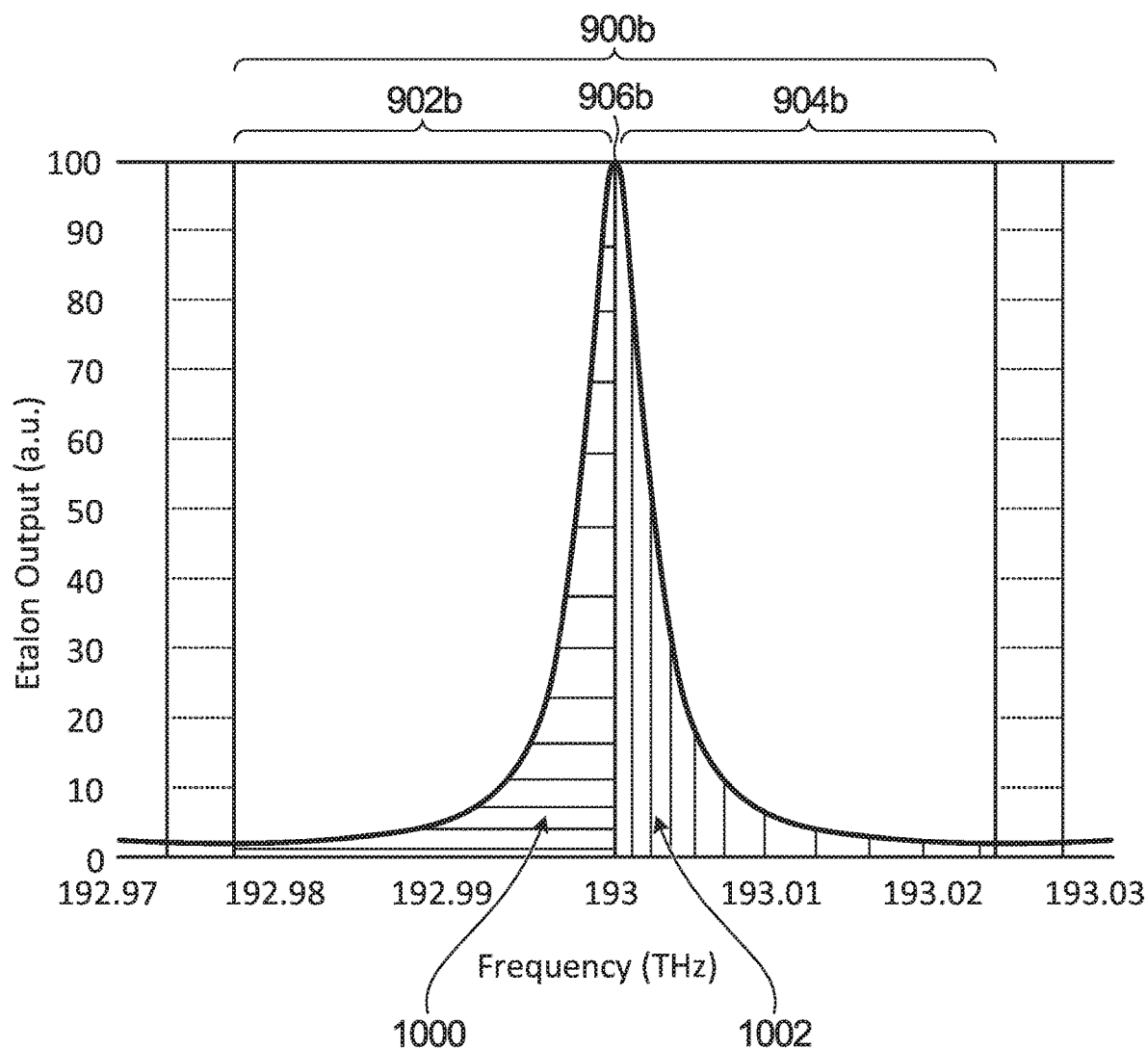
FIG. 10 is a plot illustrating an example an optical channel aligned with a transmission peak of an etalon utilized in a wavelength sensing device according to an embodiment.

FIG. 10 is a plot illustrating an example an optical channel aligned with a transmission peak of an etalon. FIG. 10 includes the spectrum 900b, negative frequency band 902b, positive frequency band 904b and transmission peak 906b from FIG. 9. FIG. 10 also includes the region 1000 (with horizontal shading) and the region 1002 (with vertical shading).

The region 1000 represents the optical power in the negative frequency band 902b that was transmitted through the etalon 810 and measured by the PD 812. This optical power was determined by the DSP 816 based on the pilot tone frequency $f_{2-}$ applied to the negative frequency band 902b. The region 1002 represents the optical power in the positive frequency band 904b that was transmitted through the etalon 810 and measured by the PD 812. This optical power was determined by the DSP 816 based on the pilot tone frequency $f_{2+}$ applied to positive frequency band 904b.

In FIG. 10, the region 1000 and the region 1002 are substantially equal in size, thus the power associated with the negative frequency band 902b substantially equals the power associated with the positive frequency band 904b. This indicates that the frequency offset between the center wavelength of the spectrum 900b provided by the laser and the position of transmission peak 906b is negligible. Thus the laser is currently tuned to the proper wavelength.

Figure 11:
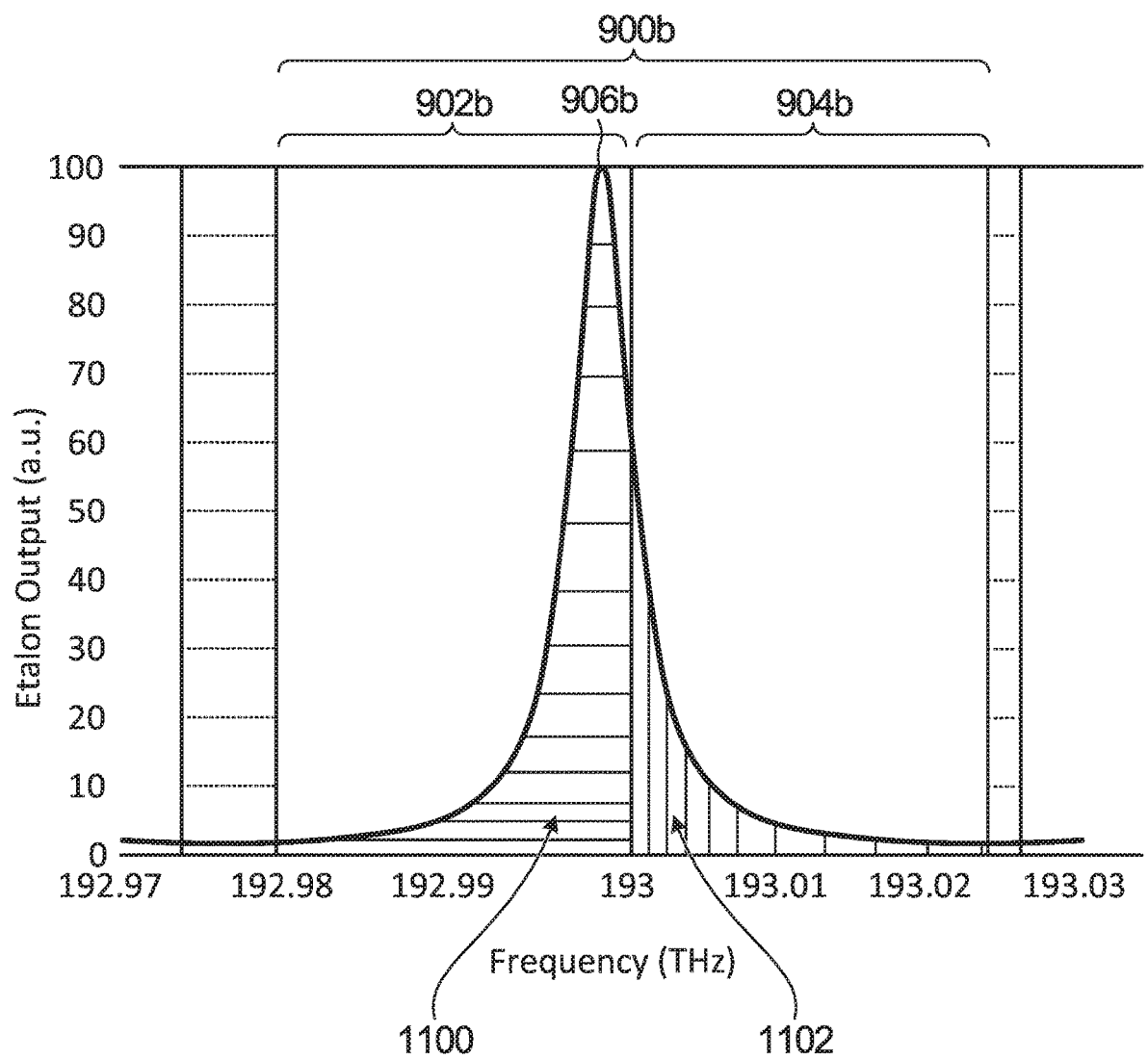
FIG. 11 is a plot illustrating an example an optical channel that is not aligned with a transmission peak of an etalon utilized in a wavelength sensing device according to an embodiment.

Referring now to FIG. 11, shown is a plot illustrating an example an optical channel that is not aligned with a transmission peak of an etalon. FIG. 10 includes the spectrum 900b, negative frequency band 902b, positive frequency band 904b and transmission peak 906b from FIG. 9. FIG. 11 also includes the region 1100 (with horizontal shading) and the region 1102 (with vertical shading).

The region 1100 corresponds to the region 1000 in FIG. 10, with the exception that region 1100 is larger in area because the spectrum 900b is shifted to a higher frequency in FIG. 11. This may represent drift in the laser source 800b, causing an offset between the center of the spectrum 900b and the transmission peak 906b. The region 1102 corresponds to the region 1002 in FIG. 10, with the exception that region 1102 is smaller in area because of the shift in the center frequency of the spectrum 900b in FIG. 11. The region 1100 and the region 1102 are not equal in size, thus the power associated with the negative frequency band 902b does not equal the power associated with the positive frequency band 904b.

FIGS. 10 and 11 illustrate that the frequency offset between the center of the spectrum 900a and the transmission peak 906a can be determined by comparing the power associated with the pilot tone applied to the negative frequency band 902b to the power associated with the pilot tone applied to the positive frequency band 904b. If these powers are approximately equal, then the center of the spectrum 900b and the position of the transmission peak 906b are substantially aligned. If these powers are differ, then the center of the spectrum 900b is offset from the position of the transmission peak 906b.

Figure 12:
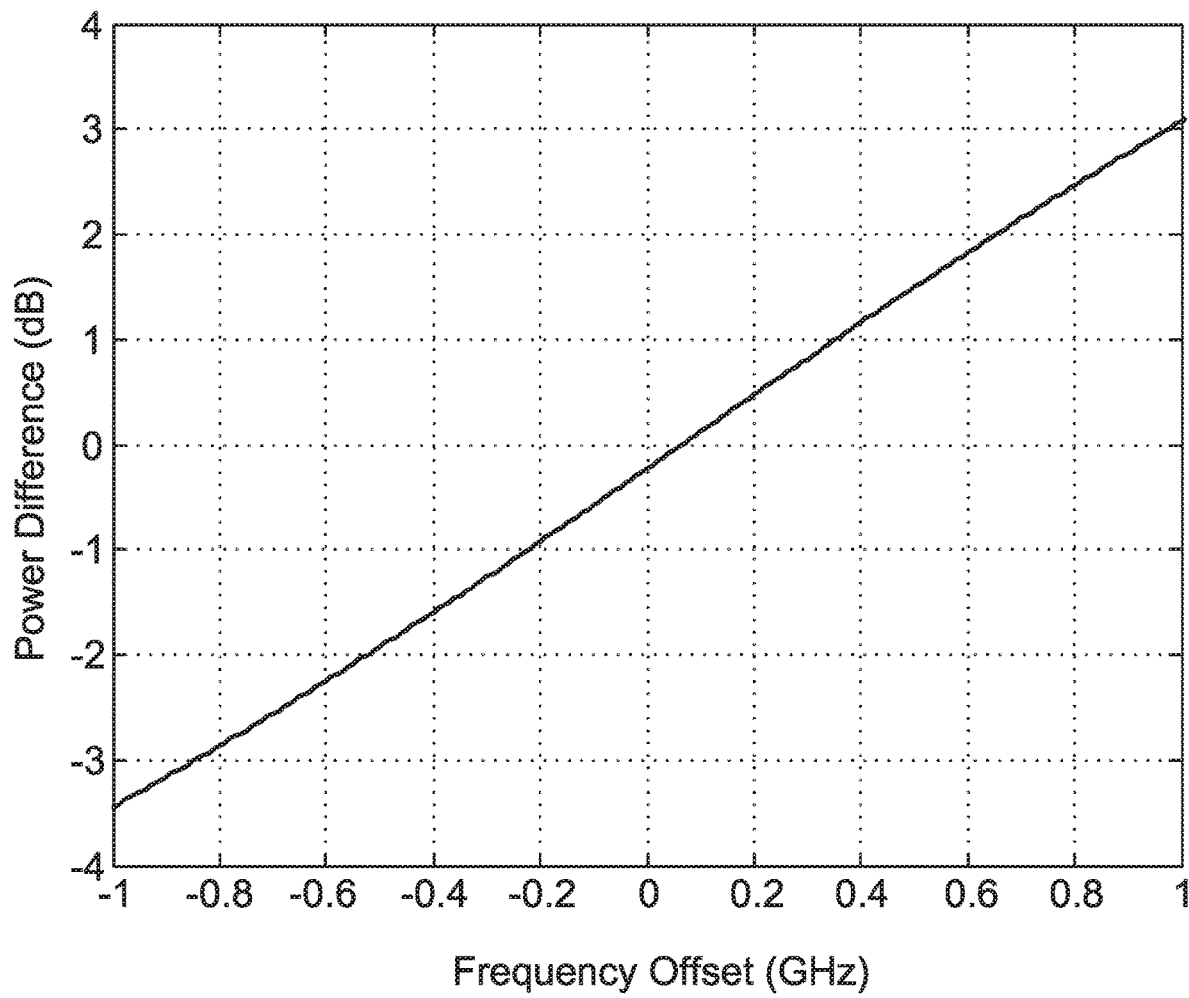
FIG. 12 is a plot illustrating an example of the relationship between frequency offset and the power difference determined by dual band pilot tones.

FIG. 12 is a plot illustrating an example of the relationship between frequency offset and the power difference determined by dual band pilot tones. In FIG. 12, the x-axis is the frequency offset between a transmission peak of an etalon and a center frequency of an optical channel. This etalon may be similar to the etalon 810 discussed above with reference to FIG. 8. The finesse of the etalon in FIG. 12 is 100. The y-axis in FIG. 12 is the power difference between the negative frequency band and the positive frequency band of the optical channel. This power difference may be determined using dual band pilot tone modulation, as discussed above with reference to FIGS. 10 and 11. As the frequency offset in FIG. 12 shifts away from zero, the power difference between the two pilot power values also generally shifts away from zero.

In some embodiments, a laser is tuned to maintain a small power difference between the negative frequency band and the positive frequency band. In these embodiments the wavelength of the optical channel produced by the laser will be locked to the corresponding transmission peak of the etalon. An etalon has a periodic transmission spectrum. Therefore, other optical channels may be locked to other transmission peaks of the same etalon. Multiple of these channels may form a super-channel, where the spacing between the etalon peaks is designed to match the desired spacing between optical channels.

In other embodiments, a laser is tuned to maintain a specific and pre-defined power difference resulting in the wavelength of the laser being somewhat offset from a particular etalon peak. Unless other lasers are tuned in a similar manner to be offset from the etalon peak, there may be an unequal spacing between the lasers.

The finesse of the etalon 810 affects the control sensitivity for the wavelength sensing device in FIG. 8. A higher finesse generally corresponds to a higher sensitivity. In some embodiments, the finesse of the etalon 810 ranges from 10-300. However, in general, other values of finesse may be used.

Figure 13:
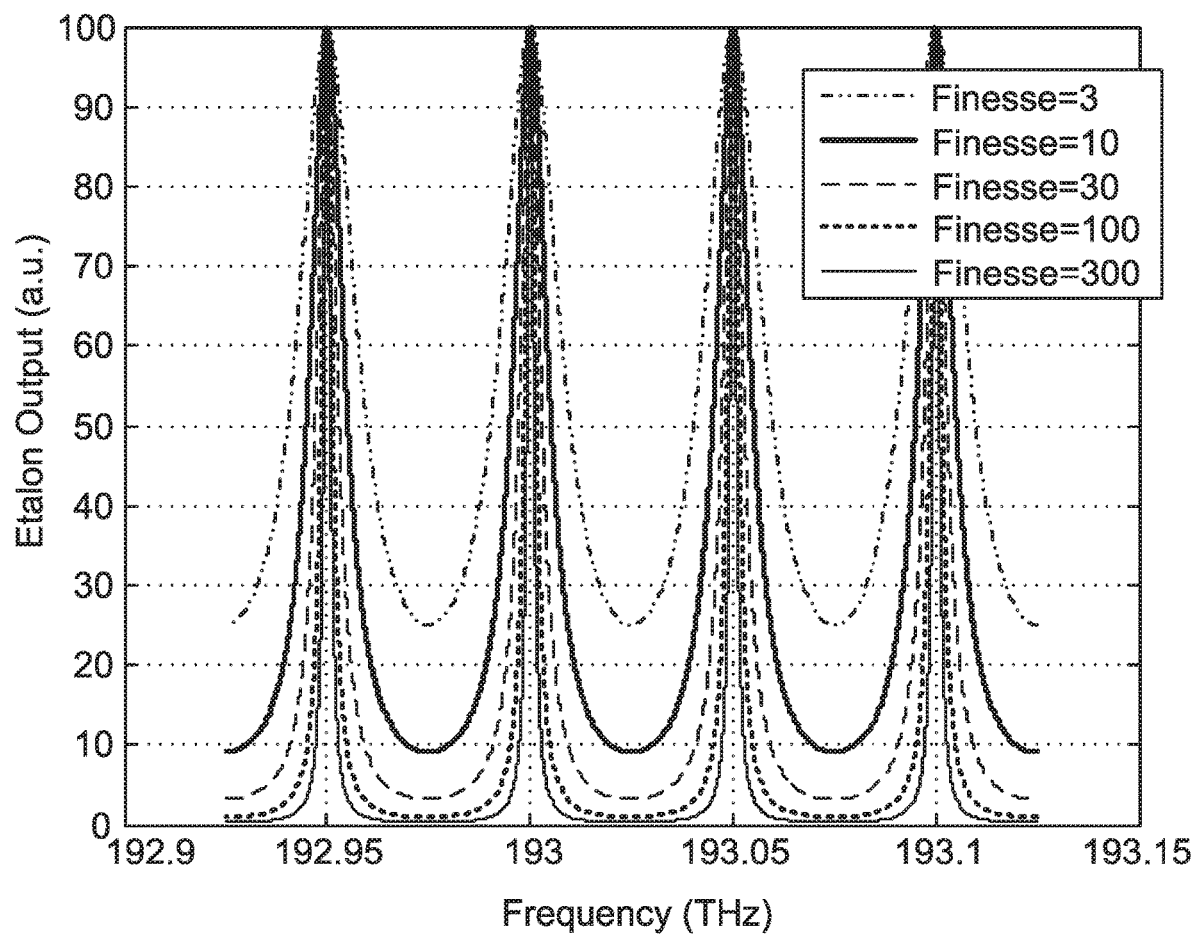
FIG. 13 is a plot illustrating examples of etalon transmission spectra for different values of finesse.

FIG. 13 is a plot illustrating examples of etalon transmission spectra for different values of finesse. The x-axis of FIG. 13 represents frequency in THz, and the y-axis represents the output or the power transmission for the etalon. The finesse of the etalon is varied between 3, 10, 30 100 and 300. As the finesse increases, the transmission peaks of the etalon become narrower. The troughs of the etalon response also become wider and deeper with higher finesse.

Figure 14:
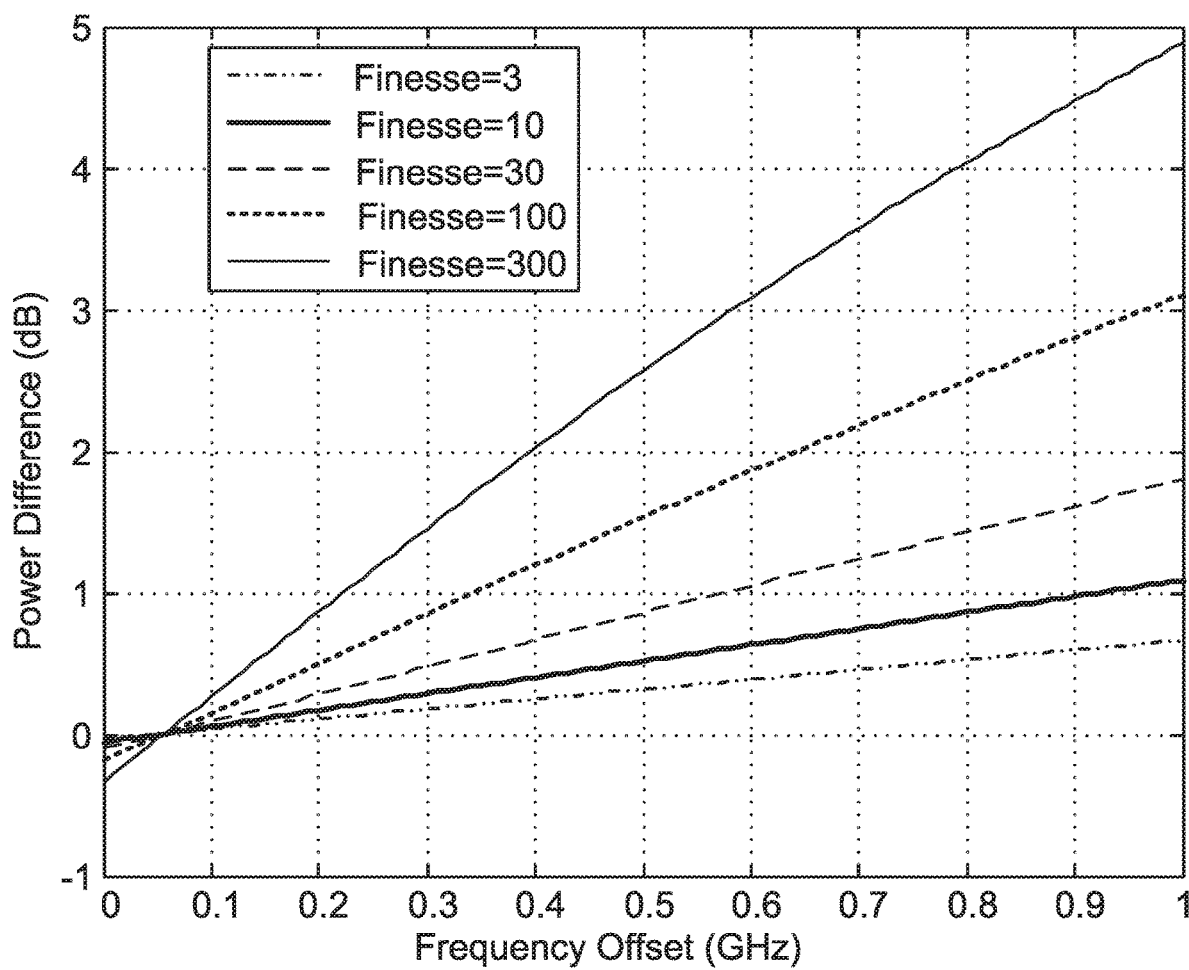
FIG. 14 is a plot illustrating examples of dual band pilot one power differences for different values of etalon finesse.

FIG. 14 is a plot illustrating examples of dual band pilot tone power differences for different values of etalon finesse. The x-axis of FIG. 14 represents frequency offset in GHz between a wavelength of an optical channel and the position of a transmission peak for an etalon. The y-axis represents power difference between a negative frequency band and a positive frequency band of a channel using, for example, the dual band pilot tone method discussed above with reference to FIGS. 8-11. The finesse of the etalon is varied between 3, 10, 30 100 and 300 in FIG. 14. As the finesse increases, the power difference slope of the corresponding curve increases, which indicates the sensitivity of the dual band pilot tone method is improved. For example, for a finesse of 300, the power difference slope is >0.5 dB/0.1 GHz. In some implementations, the wavelength sensing device illustrated in FIG. 8 may be capable of detecting a 0.1 dB power difference, and therefore the wavelength sensing device can achieve <0.1 GHz control accuracy. As such, in some embodiments, an etalon with a relatively high finesse (e.g., greater than 10) is used in a wavelength sensing device.

Advantageously, when performing multi-laser wavelength control using a single wavelength sensing device, the power and OSNR of the lasers are defined by the individual lasers (e.g., lasers 800a, 800b, 800c and 800d of FIG. 8). Therefore, the power and OSNR can be relatively high and amplification may or may not be required. There is also no need for a multi-line source. The individual lasers are each tuned based on the same frequency discrimination device (e.g., the etalon 810 of FIG. 8), and therefore there is no variability caused because different lasers are tuned using different etalons. As a result, variability in the tuning of the individual lasers may be reduced. In addition, variability in the spacing between optical channels within a super-channel may be reduced. Multi-laser wavelength control using a single wavelength sensing device could also be implemented to produce channels that do not belong to a super-channel.

Figure 15:
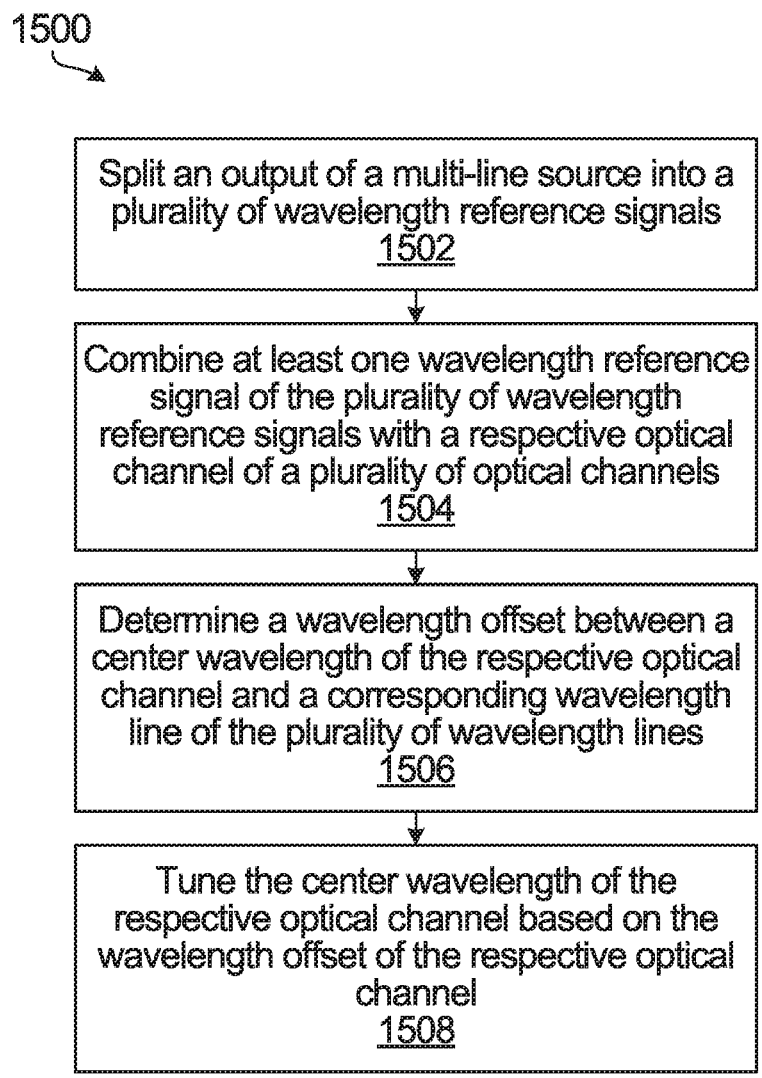
FIG. 15 is a flow chart illustrating a first method according to one embodiment.

FIG. 15 is a flow diagram 1500 of operations according to example embodiments described herein. In block 1502, an output of a multi-line source is split into a plurality of wavelength reference signals. The multi-line source includes a plurality of wavelength lines having a fixed spacing there between, and each wavelength reference signal includes the plurality of wavelength lines. In block 1504, at least one wavelength reference signal of the plurality of wavelength reference signals is combined with a respective optical channel of a plurality of optical channels. In block 1506, a wavelength offset is determined, for the at least one wavelength reference signal, between a center wavelength of the respective optical channel and a corresponding wavelength line of the plurality of wavelength lines. In block 1508, the center wavelength of the respective optical channel is tuned based on the wavelength offset of the respective optical channel.

The example operations are illustrative of an example embodiment. Various ways to perform the illustrated operations, as well as examples of other operations that may be performed, are described herein. Further variations may be or become apparent.

For example, in some embodiments, determining the wavelength offset between the center wavelength of the respective optical channel and the corresponding wavelength line of the plurality of wavelength lines includes determining the wavelength offset between the center wavelength of the respective optical channel and a wavelength line of the plurality of wavelength lines that is closest to the center wavelength of the respective optical channel.

In some embodiments, tuning the center wavelength of the respective optical channel includes tuning a laser source associated with the respective optical channel.

In some embodiments, determining the wavelength offset between the center wavelength of the respective optical channel and the corresponding wavelength line of the plurality of wavelength lines includes determining a beating frequency between the respective optical channel and the corresponding wavelength line of the plurality of wavelength lines.

In some embodiments, tuning the center wavelength of the respective optical channel based on the wavelength offset of the respective optical channel includes tuning the center wavelength of the respective optical channel to reduce the beating frequency between the respective optical channel and the corresponding wavelength line of the plurality of wavelength lines.

In some embodiments, tuning the center wavelength of the respective optical channel based on the wavelength offset includes tuning the center wavelength of the respective optical channel to a predefined value for the beating frequency between the respective optical channel and the corresponding wavelength line of the plurality of wavelength lines.

In some embodiments, combining the at least one wavelength reference signal of the plurality of wavelength reference signals with the respective optical channel of the plurality of optical channels includes: combining a first wavelength reference signal of the plurality of wavelength reference signals with a first optical channel of the plurality of optical channels; and combining a second wavelength reference signal of the plurality of wavelength reference signals with a second optical channel of the plurality of optical channels. Further, in these embodiments, determining, for the at least one wavelength reference signal, the wavelength offset between the center wavelength of the respective optical channel and the corresponding wavelength line of the plurality of wavelength lines includes: determining, for the first wavelength reference signal, a first wavelength offset between a center wavelength of the first optical channel and a first wavelength line of the plurality of wavelength lines; and determining, for the second wavelength reference signal, a second wavelength offset between a center wavelength of the second optical channel and a second wavelength line of the plurality of wavelength lines.

In some embodiments, splitting the output of the multi-line source includes splitting an output of a comb laser or a comb generator.

Figure 16:
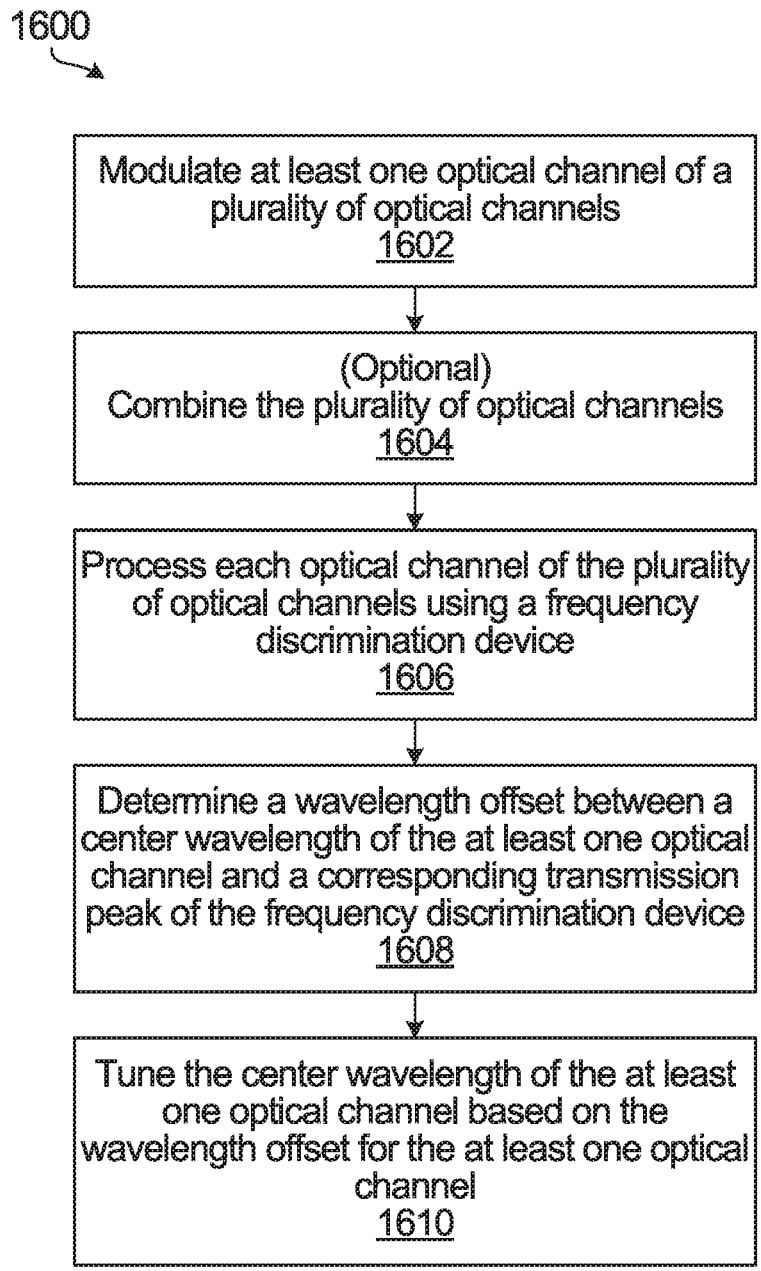
FIG. 16 is a flow chart illustrating a second method according to one embodiment.

FIG. 16 is a flow diagram 1600 of operations according to example embodiments described herein. In block 1602, at least one optical channel of a plurality of optical channels is modulated. This modulation includes modulating a first in-band pilot tone within a first portion of a spectrum of a respective optical channel and modulating a second in-band pilot tone within a second portion of the spectrum of the respective optical channel. Data can also be modulated anywhere within the spectrum of the respective optical channel. In optional block 1604, the plurality of optical channels is combined. In block 1606, each optical channel of the plurality of optical channels is processed using a frequency discrimination device. In block 1608, a wavelength offset is determined, for the at least one optical channel, between a center wavelength of the at least one optical channel and a corresponding transmission peak of the frequency discrimination device based in part on a relationship between the first and second in-band pilot tones. In block 1610, the center wavelength of the at least one optical channel is tuned based on the wavelength offset for the at least one optical channel.

The example operations are illustrative of an example embodiment. Various ways to perform the illustrated operations, as well as examples of other operations that may be performed, are described herein. Further variations may be or become apparent.

For example, in some embodiments, tuning the center wavelength of the at least one optical channel includes tuning a laser source associated with the at least one optical channel.

In some embodiments, tuning the center wavelength of the at least one optical channel includes tuning the center wavelength of the at least one optical channel to reduce the wavelength offset for the at least one optical channel.

In some embodiments, tuning the center wavelength of the at least one optical channel includes tuning the center wavelength of the at least one optical channel to adjust the wavelength offset for the at least one optical channel to a predetermined value.

In some embodiments, determining the wavelength offset based in part on a relationship between the first and second in-band pilot tones includes determining a difference between a power associated with the first in-band pilot tone and a power associated with the second in-band pilot tone.

In some embodiments, processing each optical channel of the plurality of optical channels using the frequency discrimination device includes processing each optical channel of the plurality of optical channels using an etalon.

In some embodiments, processing each optical channel of the plurality of optical channels using the frequency discrimination device includes processing each optical channel of the plurality of optical channels using a frequency discrimination device with a finesse of at least 10.

In some embodiments, modulating the at least one optical channel of the plurality of optical channels includes modulating a first optical channel of the plurality of optical channels and modulating a second optical channel of the plurality of optical channels. A spectrum of the first optical channel can be modulated with data and a spectrum of the second optical channel can be modulated with data. In these embodiments, modulating the first in-band pilot tone within the first portion of the spectrum of the respective optical channel includes: modulating the first in-band pilot tone within a first portion of the spectrum of the first optical channel; and modulating a third in-band pilot tone within a first portion of the spectrum of the second optical channel. Also, in these embodiments, modulating the second in-band pilot tone within the second portion of the spectrum of the respective optical channel includes: modulating the second in-band pilot tone within a second portion of the spectrum of the first optical channel; and modulating a fourth in-band pilot tone within a second portion of the spectrum of the second optical channel. Further, in these embodiments, determining the wavelength offset based in part on a relationship between the first and second in-band pilot tones between the center wavelength of the at least one optical channel and the corresponding transmission peak of the frequency discrimination device includes: determining a first wavelength offset between a center wavelength of the first optical channel and a first transmission peak of the frequency discrimination device based in part on a relationship between the first and second in-band pilot tones; and determining a second wavelength offset between a center wavelength of the second optical channel and a second transmission peak of the frequency discrimination device based in part on a relationship between the third and fourth in-band pilot tones.

In some embodiments, modulating the first in-band pilot tone within the first portion of the spectrum of the respective optical channel includes modulating the first in-band pilot tone within a first half of the spectrum of the respective optical channel; and modulating the second in-band pilot tone within the second portion of the spectrum of the respective optical channel includes modulating the second in-band pilot tone within a second half of the spectrum of the respective optical channel.

Numerous modifications and variations of the present disclosure are possible in light of the above teachings. It is therefore to be understood that within the scope of the appended claims, the disclosure may be practiced otherwise than as specifically described herein.

The invention claimed is:

1. A method comprising:
splitting an output of a multi-line source into a plurality of wavelength reference signals, wherein the output of the multi-line source comprises a plurality of wavelength lines having a fixed spacing there between, and each wavelength reference signal comprises the plurality of wavelength lines;
combining a first wavelength reference signal of the plurality of wavelength reference signals with a first optical channel of a plurality of optical channels;
combining a second wavelength reference signal of the plurality of wavelength reference signals with a second optical channel of the plurality of optical channels;
determining, for the first wavelength reference signal, a first wavelength offset between a center wavelength of the first optical channel and a first wavelength line of the plurality of wavelength lines;
determining, for the second wavelength reference signal, a second wavelength offset between a center wavelength of the second optical channel and a second wavelength line of the plurality of wavelength lines;
tuning the center wavelength of the first optical channel based on the first wavelength offset; and
tuning the center wavelength of the second optical channel based on the second wavelength offset.

2. The method of claim 1, wherein determining the first wavelength offset between the center wavelength of the first optical channel and the first wavelength line of the plurality of wavelength lines comprises determining the first wavelength offset between the center wavelength of the first optical channel and a wavelength line of the plurality of wavelength lines that is closest to the center wavelength of the first optical channel.

3. The method of claim 1, wherein tuning the center wavelength of the first optical channel comprises tuning a laser source associated with the first optical channel.

4. The method of claim 1, further comprising:
tuning the center wavelength of the first optical channel to within a detection bandwidth for the first wavelength line of the plurality of wavelength lines.

5. The method of claim 1, wherein determining the first wavelength offset between the center wavelength of the first optical channel and the first wavelength line of the plurality of wavelength lines comprises determining a beating frequency between the first optical channel and the first wavelength line of the plurality of wavelength lines.

6. The method of claim 5, wherein tuning the center wavelength of the first optical channel based on the first wavelength offset comprises tuning the center wavelength of the first optical channel to reduce the beating frequency between the first optical channel and the first wavelength line of the plurality of wavelength lines.

7. The method of claim 5, wherein tuning the center wavelength of the first optical channel based on the first wavelength offset comprises tuning the center wavelength of the first optical channel to a predefined value for the beating frequency between the first optical channel and the first wavelength line of the plurality of wavelength lines.

8. The method of claim 1, wherein splitting the output of the multi-line source comprises splitting an output of a comb laser or a comb generator.

9. The method of claim 2, wherein determining the second wavelength offset between the center wavelength of the second optical channel and the second wavelength line of the plurality of wavelength lines comprises determining the second wavelength offset between the center wavelength of the second optical channel and a further wavelength line of the plurality of wavelength lines that is closest to the center wavelength of the second optical channel.

10. The method of claim 3, wherein tuning the center wavelength of the second optical channel comprises tuning a further laser source associated with the second optical channel.

11. The method of claim 4, further comprising:
tuning the center wavelength of the second optical channel to within a further detection bandwidth for the second wavelength line of the plurality of wavelength lines.

12. The method of claim 5, wherein determining the second wavelength offset between the center wavelength of the second optical channel and the second wavelength line of the plurality of wavelength lines comprises determining a further beating frequency between the second optical channel and the second wavelength line of the plurality of wavelength lines.

13. An apparatus comprising:
an optical splitter to split an output of a multi-line source into a plurality of wavelength reference signals, wherein the output of the multi-line source comprises a plurality of wavelength lines having a fixed spacing there between, and each wavelength reference signal comprises the plurality of wavelength lines;
a first combiner to combine a first wavelength reference signal of the plurality of wavelength reference signals with a first optical channel of a plurality of optical channels;

a second combiner to combine a second wavelength reference signal of the plurality of wavelength reference signals with a second optical channel of the plurality of optical channels;

a first analyzer to determine, for the first wavelength reference signal, a first wavelength offset between a center wavelength of the first optical channel and a first wavelength line of the plurality of wavelength lines;

a second analyzer to determine, for the second wavelength reference signal, a second wavelength offset between a center wavelength of the second optical channel and a second wavelength line of the plurality of wavelength lines; and a laser controller to tune the center wavelength of the first optical channel of the plurality of optical channels based on the first wavelength offset.

14. The apparatus of claim 13, wherein the first wavelength line is a wavelength line of the plurality of wavelength lines that is closest to the center wavelength of the first optical channel.

15. The apparatus of claim 13, wherein the first analyzer is configured to determine a beating frequency between the first optical channel and the first wavelength line of the plurality of wavelength lines.

16. The apparatus of claim 15, wherein the laser controller is configured to tune the center wavelength of the first optical channel to reduce the beating frequency between the first optical channel and the first wavelength line of the plurality of wavelength lines.

17. The apparatus of claim 15, wherein the laser controller is configured to tune the center wavelength of the first optical channel to a predefined value for the beating frequency between the first optical channel and the first wavelength line of the plurality of wavelength lines.

18. The apparatus of claim 13, wherein the multi-line source comprises a comb laser or a comb generator.

19. The apparatus of claim 13, wherein the laser controller comprises:

a first laser controller to tune the center wavelength of the first optical channel based on the first wavelength offset; and a second laser controller to tune the center wavelength of the second optical channel based on the second wavelength offset.

20. The apparatus of claim 13, further comprising:

a plurality of laser sources to generate the plurality of optical channels, respectively.

21. The apparatus of claim 13, wherein the laser controller is further to tune the center wavelength of the first optical channel to within a detection bandwidth for the first wavelength line of the plurality of wavelength lines.

22. The apparatus of claim 14, wherein the second wavelength line is a further wavelength line of the plurality of wavelength lines that is closest to the center wavelength of the second optical channel.

23. The apparatus of claim 15, wherein the second analyzer is configured to determine a further beating frequency between the second optical channel and the second wavelength line of the plurality of wavelength lines.

* * * * *